US012048941B2

(12) United States Patent
Pratesi et al.

(10) Patent No.: US 12,048,941 B2
(45) Date of Patent: Jul. 30, 2024

(54) SERVICEABLE SPRINKLER WITH NUTATING DISTRIBUTION PLATE AND ASYMMETRICAL WATER CHANNELS

(71) Applicant: Senninger Irrigation, Inc., Clermont, FL (US)

(72) Inventors: William A. Pratesi, Minneola, FL (US); Jerry D. Lawyer, Clermont, FL (US); Jacob K. Keller, Minneola, FL (US)

(73) Assignee: Senninger Irrigation, Inc., Clermont, FL (US)

( * ) Notice: Subject to any disclaimer, the term of this patent is extended or adjusted under 35 U.S.C. 154(b) by 146 days.

(21) Appl. No.: 16/900,760

(22) Filed: Jun. 12, 2020

(65) Prior Publication Data

US 2021/0387211 A1 Dec. 16, 2021

(51) Int. Cl.
*B05B 3/04* (2006.01)
*B05B 3/00* (2006.01)

(52) U.S. Cl.
CPC ............ *B05B 3/0486* (2013.01); *B05B 3/008* (2013.01)

(58) Field of Classification Search
CPC .............................. B05B 3/008; B05B 3/0486
See application file for complete search history.

(56) References Cited

U.S. PATENT DOCUMENTS 2,848,276 A 8/1958 Clearman
3,009,648 A 11/1961 Hait
3,034,728 A 5/1962 Hruby, Jr.
3,091,400 A 5/1963 Aubert
3,312,400 A 4/1967 Clearman
3,682,388 A 8/1972 Ferguson
3,799,453 A 3/1974 Hart
4,356,972 A 11/1982 Vikre
4,398,666 A 8/1983 Hunter
4,487,368 A 12/1984 Clearman
4,773,594 A 9/1988 Clearman
4,796,811 A 1/1989 Davisson
RE33,823 E 2/1992 Nelson et al.
(Continued)

FOREIGN PATENT DOCUMENTS

EP 3597302 A1 1/2020

*Primary Examiner* — Steven M Cernoch
(74) *Attorney, Agent, or Firm* — KNOBBE MARTENS OLSON & BEAR LLP

(57) ABSTRACT

A sprinkler assembly with a nutating distribution plate that tilts and/or rotates upon water impinging the distribution plate. A deflector assembly includes the distribution plate and a base. A body of the sprinkler assembly includes a base retainer surface and a flanged bolt which combine to create a portion of a confinement structure. A portion of the deflector assembly is located within the confinement structure to limit a range of movement of the distribution plate. A nozzle subassembly includes a nozzle and retainer supporting a seal. The nozzle alone or in combination with the retainer can be removed from the sprinkler assembly. The sprinkler assembly can be disassembled and reassembled with minimal tools and effort for servicing. The distribution plate and the base can have mass properties optimized to improve sprinkler performance by reducing vibration, improving uniform water distribution, and reducing fine water droplet generation upon water stream impingement on the distribution plate.

18 Claims, 32 Drawing Sheets

(56) References Cited

U.S. PATENT DOCUMENTS

| | | | |
|---|---|---|---|
| 5,234,169 | A | 8/1993 | McKenzie |
| 5,372,307 | A | 12/1994 | Sesser |
| 5,381,960 | A | 1/1995 | Sullivan et al. |
| 5,439,174 | A | 8/1995 | Sweet |
| 5,671,885 | A | 9/1997 | Davisson |
| 5,671,886 | A | 9/1997 | Sesser |
| 5,699,962 | A | 12/1997 | Scott |
| 5,950,927 | A | 9/1999 | Elliot et al. |
| 5,971,297 | A | 10/1999 | Sesser |
| 6,176,440 | B1 | 1/2001 | Elliot |
| 6,186,414 | B1 | 2/2001 | Clearman et al. |
| 6,199,771 | B1 | 3/2001 | Clearman |
| 6,341,711 | B1 | 1/2002 | Blake |
| 6,382,525 | B1 | 5/2002 | Santiesteban et al. |
| 6,439,477 | B1 | 8/2002 | Sweet et al. |
| 6,530,532 | B1 | 3/2003 | Santiesteban et al. |
| 6,676,038 | B2 | 1/2004 | Gressett |
| 6,871,795 | B2 | 3/2005 | Anuskiewicz |
| 6,932,279 | B2 | 4/2005 | Burcham |
| 6,899,287 | B2 | 5/2005 | Pinch et al. |
| 7,037,960 | B2 | 5/2006 | Ukai |
| 7,070,122 | B2 | 7/2006 | Burcham |
| 7,100,842 | B2 | 9/2006 | Meyer et al. |
| 7,287,710 | B1 | 10/2007 | Nelson et al. |
| 7,395,977 | B2 | 7/2008 | Pinch et al. |
| 7,562,833 | B2 | 7/2009 | Perkins |
| 7,770,821 | B2 | 8/2010 | Pinch et al. |
| 7,942,345 | B2 | 5/2011 | Sesser et al. |
| 8,556,196 | B2 | 10/2013 | Lawyer et al. |
| 8,584,969 | B2 | 11/2013 | Drechsel |
| 8,991,724 | B2 | 3/2015 | Sesser |
| 10,710,103 | B2 | 7/2020 | Lawyer et al. |
| 11,213,836 | B2 * | 1/2022 | Duffin .................... B05B 3/008 |
| 2006/0249594 | A1 | 11/2006 | Pinch |
| 2009/0078788 | A1 | 3/2009 | Tony |
| 2010/0252654 | A1 | 10/2010 | Sesser et al. |
| 2011/0155827 | A1 | 6/2011 | Dreschel |
| 2013/0327846 | A1 | 12/2013 | Sesser |
| 2014/0110501 | A1 | 4/2014 | Lawyer et al. |
| 2014/0312143 | A1 | 10/2014 | Duffin et al. |
| 2016/0256877 | A1 | 9/2016 | Holmes |
| 2018/0311684 | A1 * | 11/2018 | Lawyer .................. B05B 1/265 |
| 2019/0336994 | A1 | 11/2019 | Duffin et al. |
| 2020/0047195 | A1 | 2/2020 | Healy |
| 2020/0222922 | A1 | 7/2020 | Duffin et al. |
| 2020/0290060 | A1 | 9/2020 | Lawyer |

* cited by examiner

Section 7-7

Detail 7A

SERVICEABLE SPRINKLER WITH NUTATING DISTRIBUTION PLATE AND ASYMMETRICAL WATER CHANNELS

TECHNICAL FIELD

The present disclosure relates to apparatuses for irrigating turf, agriculture, and/or landscaping.

BACKGROUND

In many parts of the world, rainfall can be insufficient and/or too irregular to keep turf and landscaping green and/or to sufficiently water crops and other agricultural products. Therefore, irrigation systems are often installed to provide adequate irrigation to landscaping and/or agricultural products.

SUMMARY

In certain irrigation applications, it can be advantageous to utilize sprinklers with a nutating distribution plate. For example, sprinklers with a nutating distribution plate can utilize fewer parts than a gear driven sprinkler. Sprinklers with a nutating distribution plate can also be capable of operating using relatively large unobstructed water flow paths for overhead irrigation of large fields and crops. Utilizing larger water flow paths can reduce the need to finely filter or otherwise purify water used for irrigation. In some such cases, water from rivers, streams, lakes, ponds, wells, and/or other water sources can be used with less purification infrastructure than may be necessary for gear driven sprinklers.

However, it can be important to provide such sprinklers with interchangeable nozzles for varying conditions. In some applications, it may be important for the sprinkler to operate with a flow of 0.80 gallons of water per minute or less. In some applications, it may be important for the sprinkler to operate with a flow of 18 gallons of water per minute or more. A wide variety of nozzles can allow for many different flows. When the distribution plate rocks and rotates while the water is applied, asymmetrical water channels in the distribution plate can help to optimize the speed of rotation with various water flows from the different nozzles.

In some embodiments, a sprinkler assembly comprises an inlet configured to receive water, a body supported by the inlet and having a confinement structure, and a nozzle supported by the body and disposed downstream of the inlet. The nozzle is in fluid communication with the inlet and configured to direct the water out of the nozzle along an axis. The sprinkler assembly further comprises a deflector assembly having a base and a distribution plate. A portion of the base is disposed in the confinement structure to allow the deflector assembly to move with respect to the axis in one or both of a rotational and a tilting direction. The distribution plate comprises a plurality of channels on a side of the distribution plate facing the nozzle. At least one channel of the plurality of channels has an asymmetrical cross-sectional shape.

In some embodiments, a sprinkler assembly comprises an inlet configured to receive water, a body supported by the inlet and having a base retaining surface, and a nozzle supported by the body and disposed downstream of the inlet. The nozzle is in fluid communication with the inlet and configured to direct the water out of the nozzle along an axis. The sprinkler assembly further comprises a deflector assembly having a base and a distribution plate. The base comprises a first side and an opposite second side. The first side of the base is supported by the base retaining surface. The distribution plate comprises a plurality of channels on a side of the distribution plate facing the nozzle. At least one channel of the plurality of channels has an asymmetrical cross-sectional shape. The sprinkler assembly further comprises a flanged bolt configured to be supported by the body and disposed between the nozzle and the side of the distribution plate facing the nozzle. The flanged bolt supports the second side of the base so that the deflector assembly can move with respect to the axis in one or both of a rotational and a tilting direction.

In some embodiments, a sprinkler assembly comprises an inlet configured to receive water, a body supported by the inlet, and a nozzle supported by the body and disposed downstream of the inlet. The nozzle is in fluid communication with the inlet and configured to direct the water out of the nozzle along an axis. The sprinkler assembly further comprises a distribution plate coupled to the body to move with respect to the axis in one or both of a rotational and a tilting direction. The distribution plate has a plurality of channels on a side of the distribution plate facing the nozzle. At least one channel of the plurality of channels has sides and a bottom surface connecting the sides. The bottom surface defines a leading edge that extends along a length of the at least one channel. The leading edge is closer to one of the sides.

BRIEF DESCRIPTION OF THE DRAWINGS

Various embodiments are depicted in the accompanying drawings for illustrative purposes and should in no way be interpreted as limiting the scope of the embodiments. In addition, various features of different disclosed embodiments can be combined to form additional embodiments, which are part of this disclosure.

DETAILED DESCRIPTION

Figure 1:
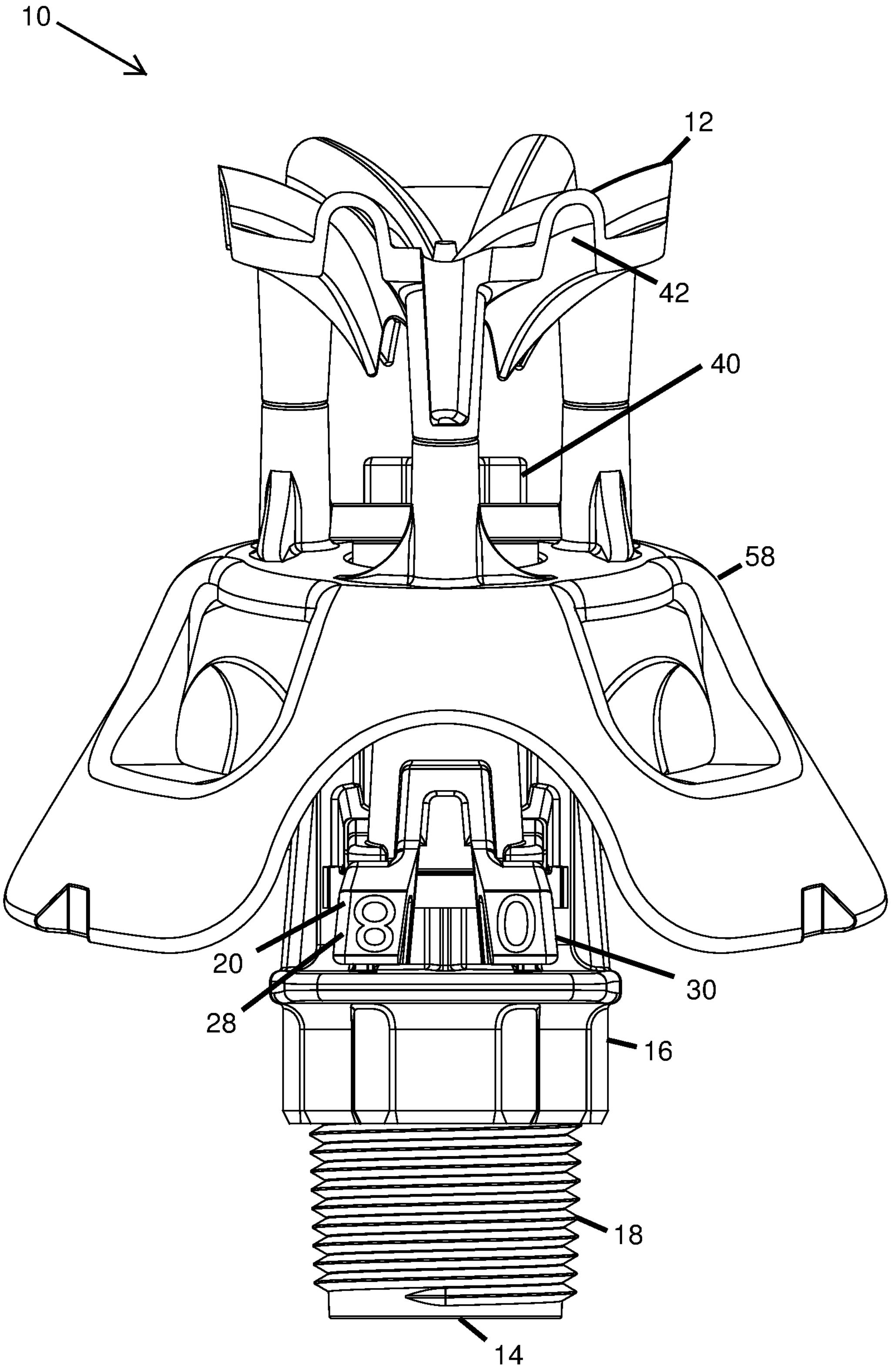
FIG. 1 is a front plan view of an embodiment of a sprinkler with a distribution plate which nutates during operation of the sprinkler showing the distribution plate located downstream of a nozzle coupled to an inlet.

FIG. 1 is a front plan view of an embodiment of a sprinkler 10 with a distribution plate 12 configured to nutate in a clockwise direction (see FIG. 6) during operation of the sprinkler 10. A radial angle of one or more water channels 42 in the distribution plate 12 causes the distribution plate 12 to rotate in the clockwise direction. In some embodiments, the water channels 42 can be formed to cause the distribution plate 12 to rotate in a counter-clockwise direction.

In some embodiments, a cross-sectional shape of the one or more water channels 42 in the distribution plate 12 is selected to cause the distribution plate 12 to rotate at different rates depending on, for example, a volumetric flow rate of water through the sprinkler 10. In some embodiments, a cross-sectional shape of the one or more water channels 42 in the distribution plate 12 is selected to cause the distribution plate 12 to rotate at the same or similar rates despite, for example, different volumetric flow rates of water through the sprinkler 10. In certain embodiments, the cross-sectional shape of the one or more water channels 42 can be asymmetric. In certain embodiments, the cross-sectional shape of the one or more water channels 42 is asymmetric relative to a vertex or bottom of the cross-sectional shape. In certain embodiments, the one or more water channels 42 can have an exit geometry that has a first side that has a degree of curvature different from a degree of curvature of a second side. For example, the first side can be nearly straight while the second side can be radiused. In certain embodiments, one or more arcs forming the first side of the exit geometry have a degree of curvature different from one or more arcs forming the second side of the exit geometry.

As explained below, the distribution plate 12 is coupled to the sprinkler 10 to exhibit a desired nutating or swaying motion about an axis of rotation and a desired rate(s) of rotation during operation of the sprinkler 10.

The sprinkler 10 can include an inlet 14. The inlet 14 defines an upstream end of the sprinkler 10. The inlet 14 can be configured to connect to a water source (e.g., an arm of an irrigation system, a water line, a hose, or some other source of water). In certain embodiments, the inlet 14 supports a body 16. In some embodiments, the inlet 14 can be formed as a part of the body 16. In some embodiments, the inlet 14 can be a separate piece that is removably or permanently attached to the body 16.

In certain embodiments, the inlet 14 comprise one or more vanes 56 disposed in at least a portion of a flow path through the inlet 14. In certain embodiments, the one or more vanes 56 are inserted into the inlet 14 after manufacture of the inlet 14. In certain embodiments, the one or more vanes 56 are molded in the flow path during manufacture of the inlet 14. The one or more vanes 56 are configured to align or straighten the water passing through the inlet 14.

In some embodiments, the inlet 14 is configured to be secured to a water supply line on an irrigation system. In some embodiments, the inlet 14 is at least partially surrounded by threads 18. The threads 18 can be screwed into the water supply line on the irrigation system. In some instances, a pressure regulator can be positioned between the water supply line and the sprinkler 10. The inlet 14 can also be screwed into an outlet of the pressure regulator. Other attachment methods, including, but not limited to, glued connections, bayonet mounts, snap rings, keys, or collars can be used to secure the sprinkler 10 to either a water supply line or a pressure regulator.

The sprinkler 10 can include a nozzle 20. The nozzle 20 can be in fluid communication with the inlet 14. The nozzle 20 can extend at least partially beyond a downstream end of the inlet 14. The nozzle 20 can be configured to output water that enters the nozzle 20 from the inlet 14. In some embodiments, the nozzle 20 can output water in a pressurized manner. For example, the nozzle 20 can direct pressurized water received from the inlet 14.

In some embodiments, the nozzle 20 can output water in a predetermined direction. For example, the nozzle 20 can output water along a longitudinal axis 46 of the nozzle 20 (see FIG. 7). In some embodiments, the nozzle 20 can direct water towards a predetermined location within the sprinkler 10. In some embodiments, the nozzle 20 can direct water in a direction towards a component of the sprinkler 10. In certain embodiments, the position of the component may be fixed, user adjustable, or movable with respect to the nozzle 20. For example, the nozzle 20 can direct water in a direction towards the distribution plate 12.

In the illustrated embodiments, the body 16 is manufactured as an integral component with the inlet 14. In alternate embodiments, the body 16 is manufactured as a separate component from the inlet 14 and subsequently coupled to the inlet 14 during assembly.

The body 16 is configured to generally support the distribution plate 12 relative to the inlet 14 and/or the nozzle 20 while allowing the distribution plate 12 to nutate during operation of the sprinkler 10. In the illustrated embodiment, the body 16 is sized and shaped to accept a flanged bolt 40 to allow the distribution plate 12 to nutate during operation of the sprinkler 10 while preventing the distribution plate 12 from separating from the sprinkler 10. In this way, the body 16 and the flanged bolt 40 prevent the distribution plate 12 from breaking free from the inlet 14 due to the force created by the pressurized water exiting the nozzle 20 impinging on the distribution plate 12.

Figure 2:
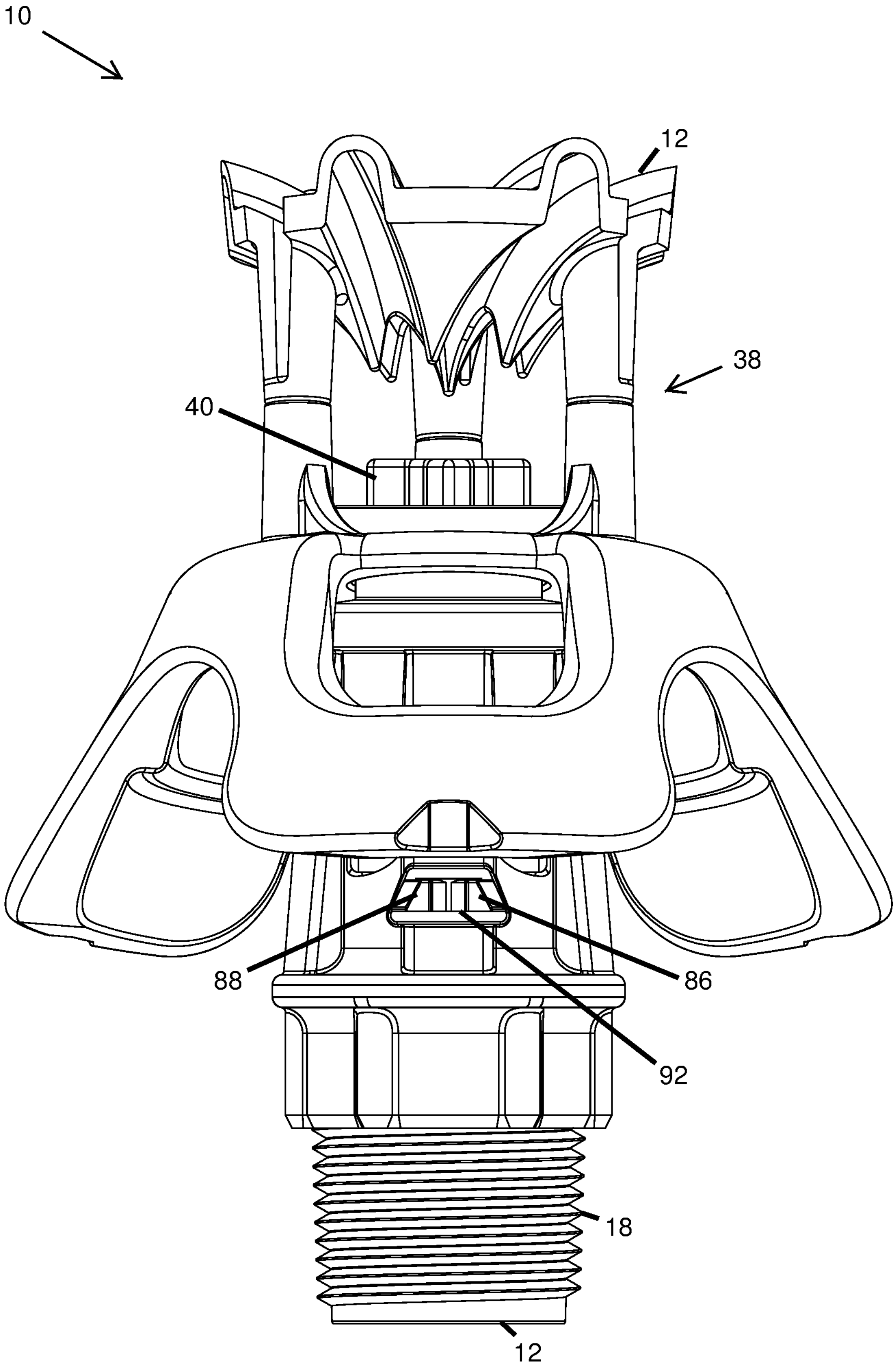
FIG. 2 is a back plan view of the sprinkler of FIG. 1.
Figure 3:
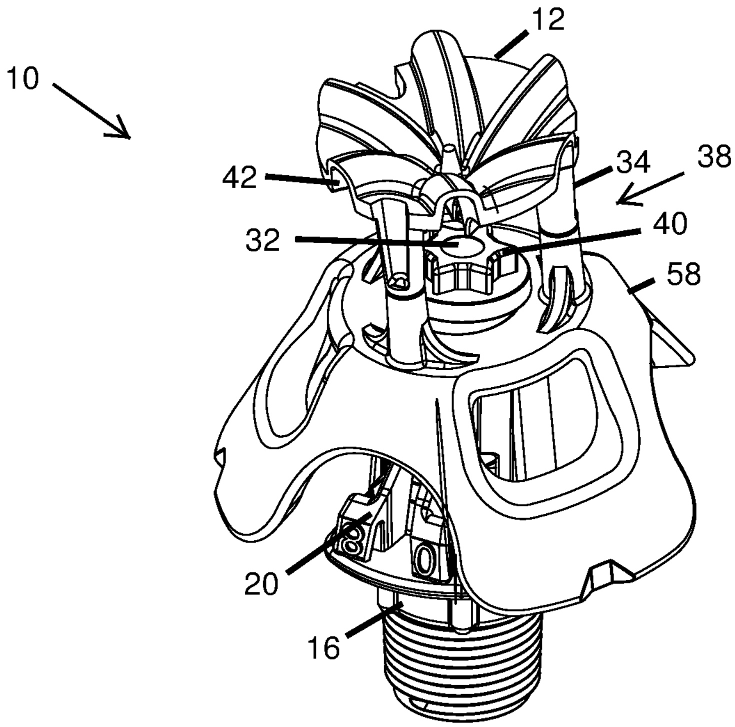
FIG. 3 is a top perspective view of the sprinkler of FIG. 1 showing one or more water channels and a through hole through a flanged bolt for water to flow from the nozzle to the distribution plate.

FIG. 2 is a back plan view of the sprinkler 10 of FIG. 1. The body 16 can directly or indirectly couple to the distribution plate 12. In the illustrated embodiment, the body 16 couples the inlet 14 to the distribution plate 12 via the flanged bolt 40. In some embodiments, the flanged bolt 40 can incorporate a through hole 32 (FIG. 3). In certain embodiments, the through hole 32 provides an unobstructed passageway for the water leaving the nozzle 20 to contact the distribution plate 12. In other embodiments, the body 16 directly couples to the distribution plate 12 while allowing the distribution plate 12 to nutate during operation of the sprinkler 10. For example, the body 16 can couple to the distribution plate 12 via a joint such as a ball joint or ball-and-socket joint.

FIG. 3 is a top perspective view of the sprinkler 10 of FIG. 1 showing the one or more water channels 42 on an upstream side of the distribution plate 12. The distribution plate 12 can be positioned downstream of the nozzle 20. In some embodiments, the nozzle 20 is configured to direct water onto the distribution plate 12.

Water impingement on the distribution plate 12 can cause the distribution plate 12 to "nutate, or rotate and tilt side to side." For example, the distribution plate 12 can be configured to rotate and/or tilt with respect to the longitudinal axis 46 of the nozzle 20 or some other axis thereof, and/or undergo nutation in reaction to water impingement from the nozzle 20 onto the distribution plate 12. In the illustrated embodiment, the water impingement from the nozzle 20 contacts the one or more water channels 42 on the upstream side of the distribution plate 12 imparting lateral forces on the distribution plate 12. Tilting and rotation of the distribution plate 12 can allow water to be dispersed in different directions. Dispersing water in different directions can facilitate a more even distribution of water about an area of irrigation than a sprinkler without the distribution plate 12 which nutates.

In the illustrated embodiment, the distribution plate 12 forms a component of a deflector assembly 38 which will be further described below. In certain embodiments, the deflector assembly 38 further comprises a base 58.

In certain embodiments, the deflector assembly 38 is supported by the body 16 and the flanged bolt 40 to allow the deflector assembly 38, which carries the distribution plate 12, to tilt and rotate in concert with the distribution plate 12. As mentioned above, the flanged bolt 40, which will be described in greater detail below, can be releasably coupled to the body 16.

Figure 4:
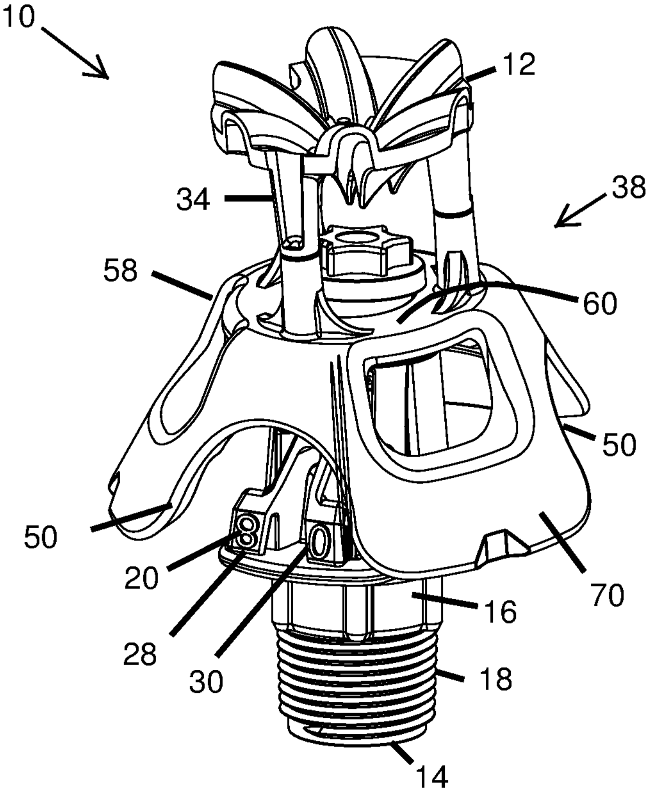
FIG. 4 is another top perspective view of the sprinkler of FIG. 1 showing a skirt sculptured to allow for easy access to the nozzle from a side of the sprinkler of FIG. 1.

FIG. 4 is a side perspective view of the sprinkler 10 of FIG. 1 showing the distribution plate 12 mated to the base 58 to form the deflector assembly 38. The base 58 and the distribution plate 12 can be manufactured as a unitary structure. In certain embodiments, the base 58 and the distribution plate 12 are separately manufactured and then assembled to form the deflector assembly 38. In certain embodiments, the base 58 supports the distribution plate 12 via one or more legs 34. The one or more legs 34 can be a separate structure, a portion of the distribution plate 12, a portion of the base 58, or portions of both the distribution plate 12 and the base 58. In certain embodiments, the one or more legs 34 are part of both the distribution plate 12 and the base 58.

In certain embodiments, the base 58 comprises a cap 60 and a skirt 70. In some embodiments, the skirt 70 has a shape complementary to the shape of the body 16 to prevent the base 58 from interfering with the radial and side-to-side motion of the deflector assembly 38. In certain embodiments, the one or more legs 34 extend from the cap 60 in a direction towards the distribution plate 12. In certain embodiments, the skirt 70 extends from the cap 60 in a direction away from the distribution plate 12.

The cap 60 and the skirt 70 can be manufactured as a unitary structure. In certain embodiments, the cap 60 and the skirt 70 are separately manufactured and then assembled to form the base 58. In the illustrated embodiment, the cap 60 and the skirt 70 are formed as a unitary structure along with at least a portion of the one or more legs 34.

In certain embodiments, the base 58 can have one or more recesses 50 formed in at least one portion of the skirt 70. For example, the skirt 70 illustrated in FIG. 4 comprises three recesses 50. The three recesses 50 are spaced equally about the outer circumference of the sprinkler 10. Of course, the skirt 70 can comprise more or less than three recesses 50 and the recesses 50 need not be spaced equally about the outer circumference of the sprinkler 10. In some embodiments, it may be desirable to have the recesses 50 spaced equally about the outer circumference of the sprinkler 10 to balance the deflector assembly 38 as the deflector assembly 38 rotates and tilts during normal operation. In some embodiments, the one or more recesses 50 can be formed to provide access to remove or replace the nozzle 20 from the sprinkler 10 without disassembling the deflector assembly 38 from the body 16.

Figure 6:
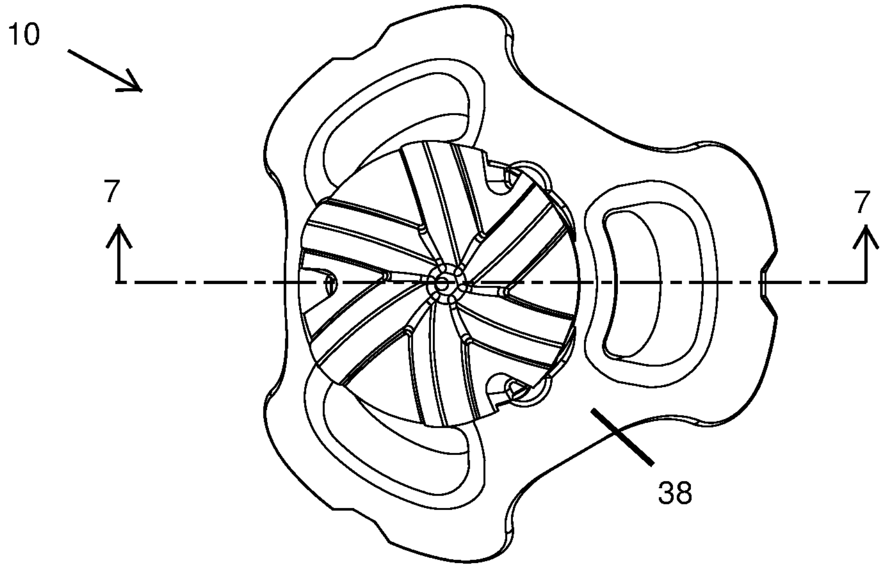
FIG. 6 is a top view of the sprinkler of FIG. 5 showing an outer surface of the distribution plate.
Figure 5:
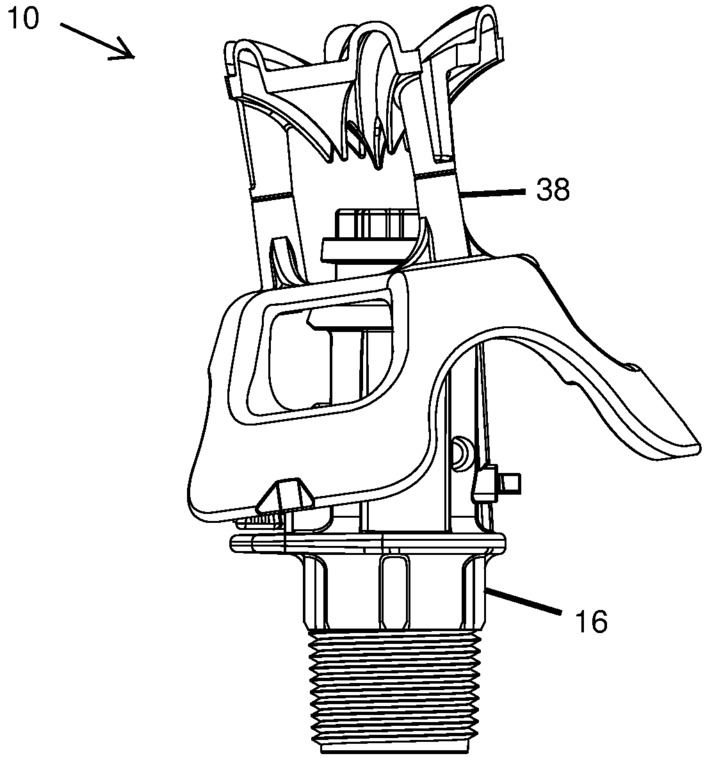
FIG. 5 is a side elevation view of the sprinkler of FIG. 1.

FIG. 5 is a side elevation view of the sprinkler 10 of FIG. 1 with the deflector assembly 38 tilted relative to the body 16. FIG. 6 is a top view of the sprinkler 10 of FIG. 5 showing an outer surface of the distribution plate 12.

Figure 7:
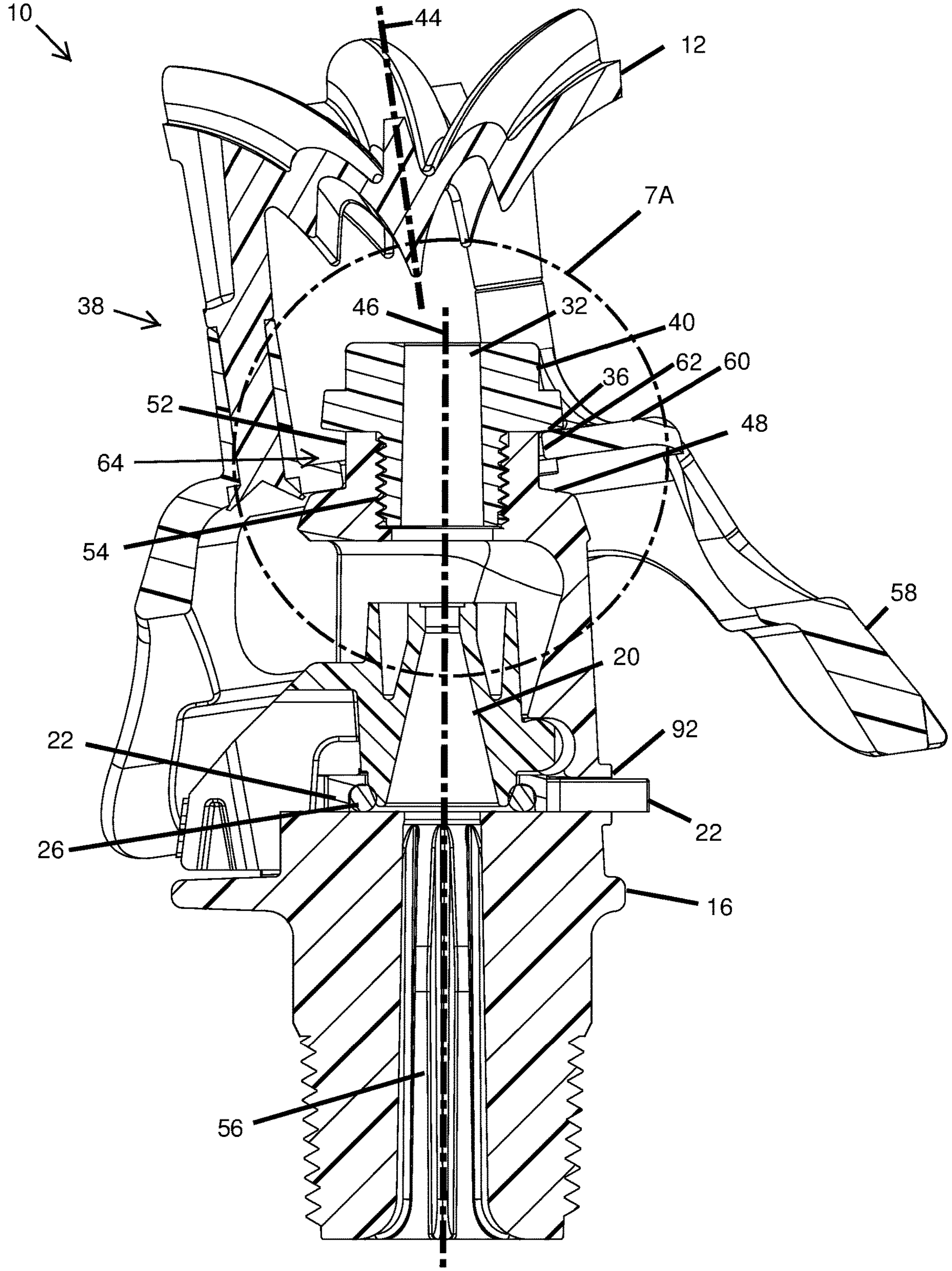
FIG. 7 is a cross-sectional view of the sprinkler of FIG. 5, as viewed along the cut-plane 7-7 of FIG. 6, showing the distribution plate of a deflector assembly located downstream of the nozzle and temporarily positioned so that a central axis of the deflector assembly is off axis from a longitudinal axis of the nozzle.
Figure 7A:
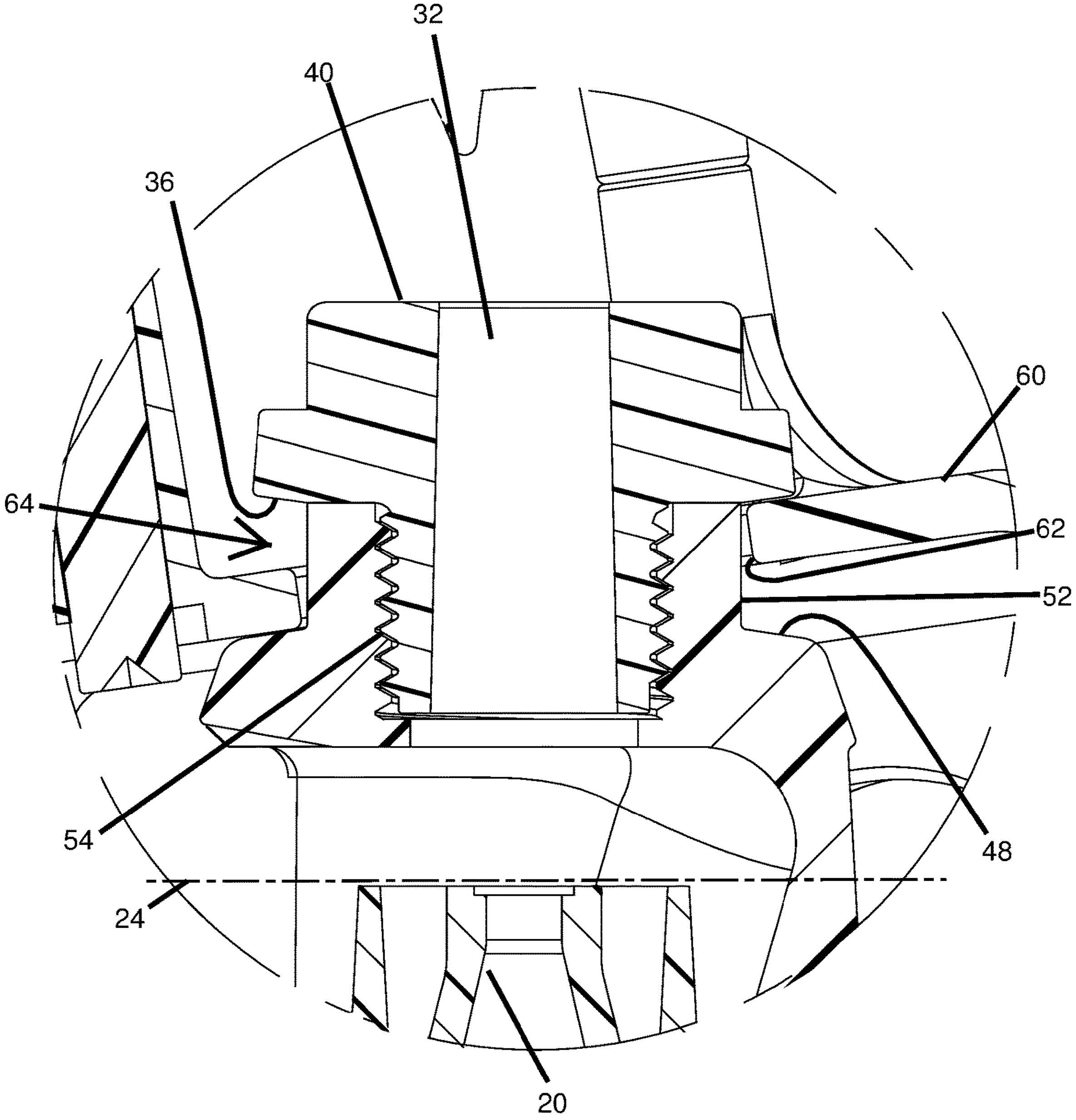
FIG. 7A is an enlarged view of a portion of the nozzle including the flanged bolt from FIG. 7.

FIG. 7 is a cross-sectional view of the sprinkler 10 of FIG. 1, as viewed along the cut-plane 7-7 of FIG. 6. FIG. 7A is an enlarged view of a portion of the nozzle 20 including the flanged bolt 40 from FIG. 7. In certain embodiments, the flanged bolt 40 includes a flange 36. The flange 36 can have a flat or tapered shape, or otherwise a curved surface. In some embodiments, a skirt 70 portion of the base 58 has a shape complementary to the shape of the body 16 that does not interfere with the radial and side-to-side motion of the deflector assembly 38.

FIGS. 7 and 7A are showing the distribution plate 12 located downstream of the nozzle 20 and temporarily positioned so that the central axis 44 of the distribution plate 12 is off axis from the longitudinal axis 46 of the nozzle 20. In some embodiments, the entire deflector assembly 38, including the distribution plate 12, is located downstream of the nozzle 20. In the illustrated embodiment, a portion of the deflector assembly 38, including the distribution plate 12, is located downstream of a plane 24 defined by the exit from the nozzle 20. In the illustrated embodiment, the deflector assembly 38 does not contact the sprinkler 10 at a location that is upstream of the plane 24 to not interfere with operation of the sprinkler 10.

In some embodiments, the sprinkler 10 includes a retainer 22. In some embodiments, the retainer 22 is disposed downstream of the inlet 14. In some embodiments, the retainer 22 can be connected to the body 16. In some embodiments, the retainer 22 can be removably connected to the body 16. In some embodiments, the nozzle 20 can be coupled to the body 16 and positioned downstream from the retainer 22.

In certain embodiments, the retainer 22 comprises an internal flow path. In some embodiments, at least a portion of the internal flow path can be straight, substantially straight, and/or tapered inward between an upstream end of the retainer 22 and a downstream end of the retainer 22.

In certain embodiments, the sprinkler 10 comprises a seal 26. The seal 26 is configured to prevent pressurized water from leaking between the body 16 and the nozzle 20. In some embodiments, the seal 26 is in the form of an O-ring. In some embodiments, the retainer 22 supports the seal 26. In some embodiments, the seal 26 can be positioned at least partially within the retainer 22. In certain embodiments, the nozzle 20, the seal 26, and the retainer 22 form a nozzle subassembly 102 as will be further described below.

In certain embodiments, the nozzle 20 can be removed and reinstalled to position the nozzle 20 on the body 16 without any tools. As illustrated most clearly in FIGS. 1 and 4, a user can pinch tabs 28 and 30 on the nozzle 20 and then move the nozzle 20 slightly upwards to disengage the nozzle 20 from the body 16 and then pull laterally to remove the nozzle 20 from the sprinkler 10. The nozzle 20 similarly can be replaced by reversing the procedure. In some embodiments, the nozzle 20 can be similar to, or the same as the nozzle disclosed in U.S. Pat. No. 8,556,196, titled QUICK CHANGE NOZZLE of Lawyer et. al., issued on Oct. 15, 2013. The nozzle 20 can also include an internal taper to accelerate and/or pressurize water flow out from the nozzle 20.

In certain embodiments, the body 16 can support a base retainer surface 48 relative to the inlet 14. In some embodiments, the base retainer surface 48 can be a surface of the body 16. In some embodiments, the base retainer surface 48 is formed as part of the body 16. In the illustrated embodiment, the base retainer surface 48 is disposed downstream of the inlet 14 and upstream of the distribution plate 12. In some embodiments, the base retainer surface 48 can act as a retainer to control the radial and side-to-side motion of the deflector assembly 38. In some embodiments, the base retainer surface 48 can be positioned between the flanged bolt 40 and the body 16 when assembled.

In some embodiments, the base retainer surface 48 extends radially outward of a shaft 52. In some embodiments, the shaft 52 is formed as part of the body 16. In some embodiments, the shaft 52 is positioned at the downstream end of the body 16. In certain embodiments, the flanged bolt 40 can be attached to the body 16 at the shaft 52. In some embodiments, a threaded portion 54 is disposed in the shaft 52. In some embodiments, the flanged bolt 40 can be threaded into the threaded portion 54. In some embodiments, the shaft 52 acts as a spacer to create a space between the flanged bolt 40 and the base retainer surface 48.

In some embodiments, the cap 60 of the base 58 includes bore 62. In certain embodiments, the bore 62 extends through the cap 60. In certain embodiments, the bore 62 is disposed in a center of the cap 60. The bore 62 can be sized to loosely fit over the shaft 52. In some embodiments, the base retainer surface 48, the shaft 52, and the flange 36 combine to create a confinement structure 64. In some cases, the cap 60 can be loosely confined within the confinement structure 64 to allow proper operation of the deflector assembly 38. In some embodiments, a cross-section of the confinement structure 64 has a linear shape. In some embodiment, the cross-section of the confinement structure 64 has a curved shape such as an L-shape. In the illustrated embodiment, the cross-section of the confinement structure 64 is H shaped, or C-shaped on each side. In some embodiments, the cross-section of the confinement structure 64 is symmetrical. In some embodiments, the cross-section of the confinement structure 64 is asymmetrical. In some cases, the confinement structure 64 is positioned between the nozzle 20 and the distribution plate 12.

In some embodiments, the confinement structure 64 is positioned to focus intermittent or transitory contact between the deflector assembly 38 and the sprinkler 10 during operation of the sprinkler 10. In some embodiments where the confinement structure 64 has a curved shape such as an H or C-shape, the contact between the deflector assembly 38 and the sprinkler 10 can occur on multiple surfaces of the confinement structure 64. The shape and/or position of the shaft 52 with respect to one or more of the base retainer surface 48, the flanged bolt 40, the distribution plate 12, and the deflector assembly 38 can confine the deflector assembly 38 in such a way as to allow the deflector assembly 38 to rotate and tilt when pressurized water is flowing through the nozzle 20 and impinging on the distribution plate 12.

In the illustrated embodiment, a range of the radial and side-to-side motion of the deflector assembly 38 upon the body 16 is limited by the confinement structure 64. In this way, any resulting forces due to the deflector assembly 38 nutating during operation of the sprinkler 10 passes through the cap 60 and the confinement structure 64. By limiting the range of motion of the deflector assembly 38, the confinement structure 64 keeps the distribution plate 12 in a working alignment with the longitudinal axis 46 of the nozzle 20. The working alignment can allow water flowing out of the nozzle 20 to be directed to the distribution plate 12.

As shown in FIGS. 7 and 7A and in some embodiments, the confinement structure 64 is the only transitory or intermittent contact portion of the deflector assembly 38 with the remainder of the sprinkler 10.

Figure 8:
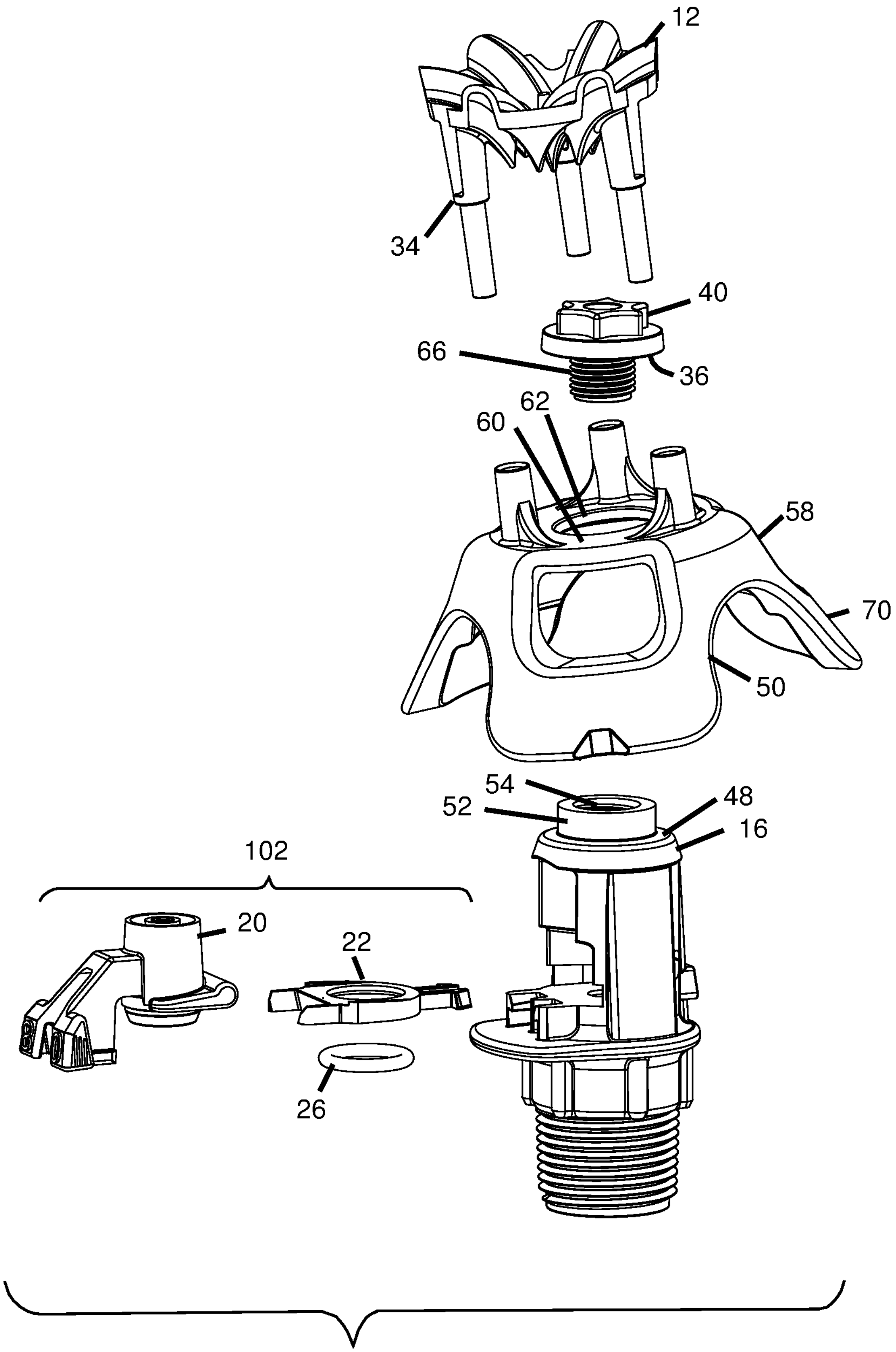
FIG. 8 is a perspective exploded view of the sprinkler of FIG. 5 including a body configured to receive a nozzle subassembly.

FIG. 8 is a perspective exploded view of the sprinkler 10 of FIG. 1. In some embodiments, the base 58 extends from the distribution plate 12 on the same side of the distribution plate 12 as the one or more water channels 42. In some embodiments, the base 58 directly couples the distribution plate 12 to the body 16. In some embodiments, the base 58 indirectly couples the distribution plate 12 to the body 16 via one or more other components.

In the illustrated embodiment, the bore 62 in the cap 60 receives at least a portion of the shaft 52 of the body 16 when the base 58 is assembled to the body 16. In the illustrated embodiment, the flanged bolt 40 comprises an external threaded portion 66. The external threaded portion 66 is configured to engage with the internal threaded portion 54 within the shaft 52 to secure the base 58 between the flanged bolt 40 and the body 16. In this way, the flanged bolt 40 can be screwed into shaft 52 on the downstream end of the body 16 to form the confinement structure 64. In some embodiments, the flanged bolt 40 can also be removably attached to the body 16 by using bayonet mounts, snap rings, keys, or collars or other attachment methods (e.g., attachment structures or methods that may or may not require use of tools or specialized tools for disconnection).

As illustrated in FIG. 8, the base retainer surface 48 can be an upper or distal surface of the body 16. The base retainer surface 48 can have a flat or tapered shape, or otherwise have a curved surface. The base retainer surface 48 can support the deflector assembly 38 when water is not flowing through the sprinkler 10, and/or provide a smooth surface for the deflector assembly 38 to move relative to the body 16 when water is flowing through the sprinkler 10.

In some embodiments, the flange 36 of the flanged bolt 40 is sized and shaped larger than the shaft 52 so that only the base retainer surface 48 portion of the body 16, the shaft 52, and the flange 36 contacts the base 58 over a range of the radial and side-to-side motion of the deflector assembly 38.

In some embodiments, contacts between one or more surfaces of the confinement structure 64 and the surfaces of the cap 60 can restrict the angular movement of the deflector assembly 38 and maintain the position of the deflector assembly 38 within a desirable range relative to the nozzle 20 during normal operation. The desirable range of positions allows water flowing from the nozzle 20 to impinge on the distribution plate 12.

In some embodiments, the confinement structure 64 can provide a resistive interface between the deflector assembly 38 and the body 16 to slow or otherwise regulate the speed of rotation of the distribution plate 12 during operation of the sprinkler 10.

FIG. 8 further provides an exploded view of the nozzle subassembly 102. The nozzle subassembly 102 can be inserted into and locked in place to the body 16. In certain embodiments, the nozzle subassembly 102 comprises the nozzle 20, the retainer 22, and the seal 26. In certain embodiments, the retainer 22 can confine the seal 26 in position to prevent pressurized water from escaping between the body 16 and the downstream end of the nozzle 20.

In the illustrated embodiment, the nozzle 20, the retainer 22, and the seal 26 are manufactured separately and subsequently assembled to form the nozzle subassembly 102. In certain other embodiments, one or more of the retainer 22 and the seal 26 is manufactured as a unitary structure with the nozzle 20. In certain other embodiments, one or more of the nozzle 20, the retainer 22, and the seal 26 can each be assembled from multiple structures. Accordingly, the nozzle subassembly 102 need not comprise three components and instead may comprise more or fewer components.

Figure 9:
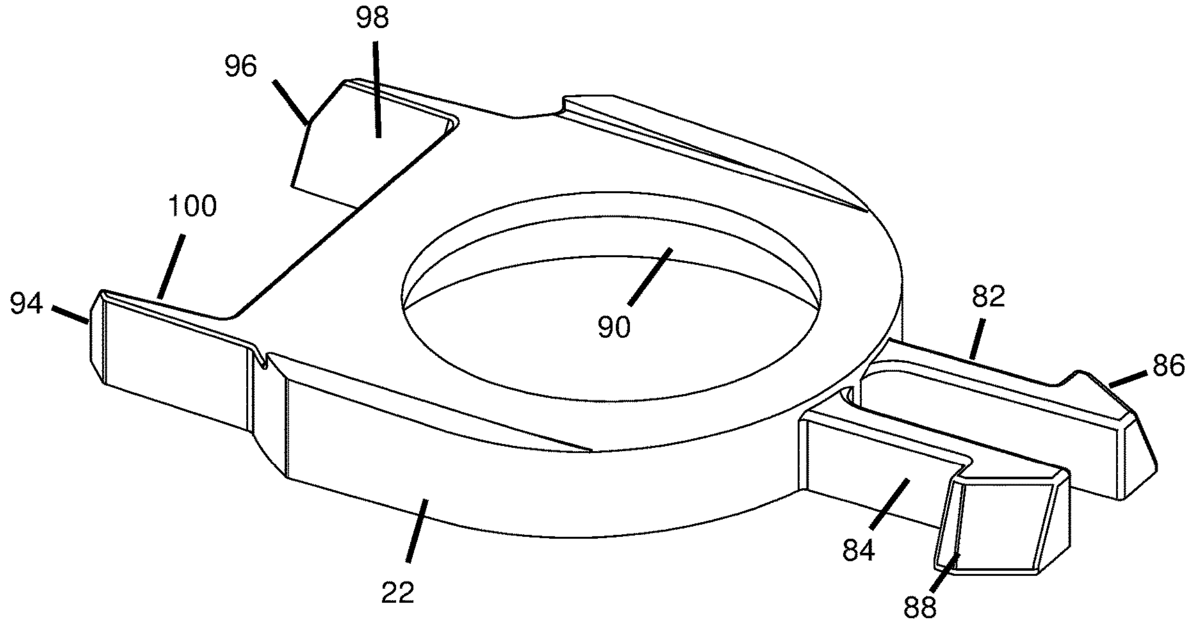
FIG. 9 is a perspective view of a retainer of the nozzle subassembly from FIG. 8.

FIG. 9 is a top perspective view of the retainer 22 from FIG. 8. In some embodiments, the retainer 22 can include one or more tabs 86, 88. In some embodiments the one or more tabs 86, 88 can be used to secure the retainer 22 to the body 16. In some embodiments, the one or more tabs 86, 88 can be used to permanently attach the retainer 22 to the body 16. In some embodiments, the one or more tabs 86, 88 can removably attach the retainer 22 to the body 16.

In the illustrated embodiment, the one or more tabs 86, 88 are coupled to the retainer 22 via two arms 82, 84. Of course, the one or more tabs 86, 88 need not be coupled to the two arms 82, 84 and instead can be directly coupled to the retainer 22. In the illustrated embodiment, the two arms 82, 84 extend outwardly from the retainer 22 with the one or more tabs 86, 88 disposed at a distal end of each arm 82, 84.

In certain embodiments, the retainer 22 comprises one or more flaps 94, 96. In the illustrated embodiment, the one or more flaps 94, 96 extend in a direction opposite to the direction of the two arms 82, 84. Of course, the one or more flaps 82, 84 need not extend in the illustrated direction. In certain embodiments, each flap 94, 96 includes a sloped surface 98, 100. The sloped surfaces 98, 100 can be configured to guide the tabs 28, 30 of the nozzle 20. For example in certain embodiments, if the retainer 22 is installed into the body 16 before installing the nozzle 20, the sloped surfaces 98, 100 can initially guide the tabs 28, 30 of the nozzle 20 when the nozzle 20 is moved from a tilted, partially installed position towards a horizontal, fully installed position. In certain embodiments, after the tabs 28, 30 have been initially guided by the sloped surfaces 98, 100, the user will continue to rotate the nozzle 20 towards the horizontal position to cause the tabs 28, 30 to move further together until the tabs 28, 30 pass between locking bars 110 on the body 16. Once the tabs 28, 30 pass between the locking bars 110, the tabs 28, 30 will open and lock against the locking bars 110 securing the nozzle 20 in position relative to the body 16.

To remove the nozzle 20 by itself from the body 16, the user can compress the tabs 28, 30 together and then tilt the nozzle 20 away from the horizontal position. The user then removes the nozzle 20 leaving the retainer 22 in the body 16.

The user can then remove the retainer 22 and the seal 26 from the body 16 by sliding the retainer 22 and the seal 26 away from the body 12. In certain embodiments, the user can pull on the flaps 94, 96 to facilitate removal of the retainer 22 and the seal 26 from the body 16.

In certain embodiments, the body 16 comprises a slot 92 (see FIG. 7) sized and shaped to receive the two arms 82, 84. In some embodiments the two arms 82, 84 can deflect inward towards each other as the one or more tabs 86, 88 enter the slot 92. When the retainer 22 and the seal 26 are fully inserted into the proper location in the body 16, the tabs 86, 88 protrude from the slot 92 allowing the two arms 82, 84 to spring apart and return to their normal position locking the retainer 22 in place. To remove the retainer 22 and the associated seal 26, the user can pinch the exposed one or more tabs 86, 88 together to deflect the two arms 82, 84 towards each other. The user can then push on the one or more tabs 86, 88 to slide the two arms 82, 84 out of the slot 92. The user can then pull on the flaps 94, 96 to remove the retainer 22 and the seal 26 from the body 16.

In certain embodiments, the retainer 22 comprises structure configured to engage with the seal 26. For example, the retainer 22 can include a counter bore 90 sized and shaped to retain the seal 26. In certain embodiments, the seal 26 nests in at least a portion of the counter bore 90. As further explained below, the retainer 22, the seal 26, and the nozzle 20 can be inserted in an assembled state as the nozzle subassembly 102 into the body 16. In some cases, the retainer 22 and the seal 26 can be inserted in an assembled state as the nozzle subassembly 102 into the body 16 prior to inserting the nozzle 20.

Figure 10:
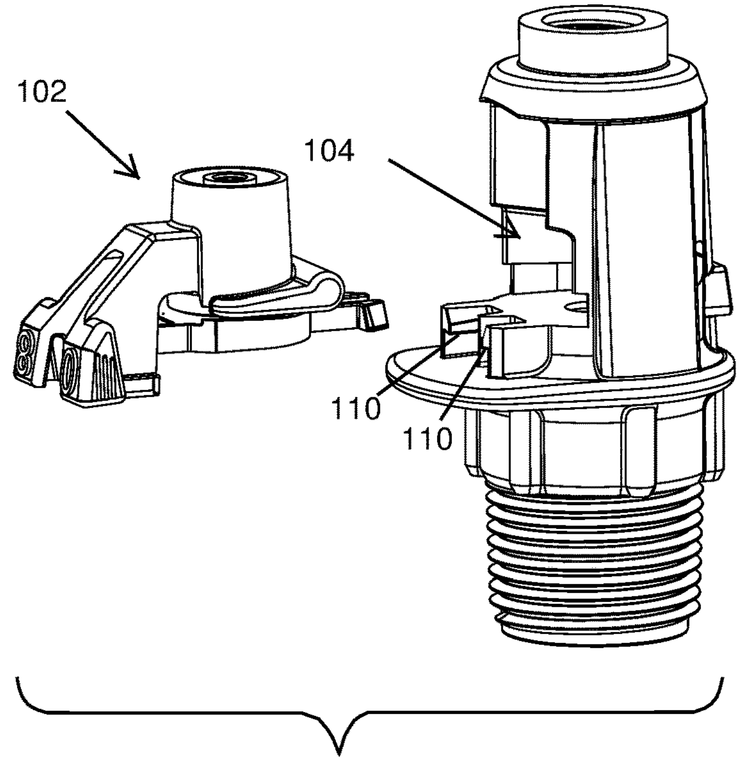
FIG. 10 is a perspective view of the body and the nozzle subassembly from FIG. 8 showing the seal and the retainer assembled to the nozzle prior to insertion of the nozzle subassembly into the body according to a first assembly process.

FIG. 10 is a perspective view of the body 16 and the nozzle subassembly 102 from FIG. 8 showing the seal 26 and the retainer 22 assembled to the nozzle 20 prior to insertion of the nozzle subassembly 102 into the body 16 according to a first assembly process. In some cases, the user can hold the three components together and slide the nozzle subassembly 102 into a cavity 104 in the body 16. As the tabs 86, 88 pass through the slot 92 they will move outwards to hold the nozzle subassembly 102 in position. The tabs 28, 30 will pass under the locking bars 110 and lock against the locking bars 110 further securing the nozzle subassembly 102 in position. As will be explained below, in certain embodiments, further securement of the nozzle subassembly 102 is provided by a hub 108 on the nozzle 20.

Figure 11:
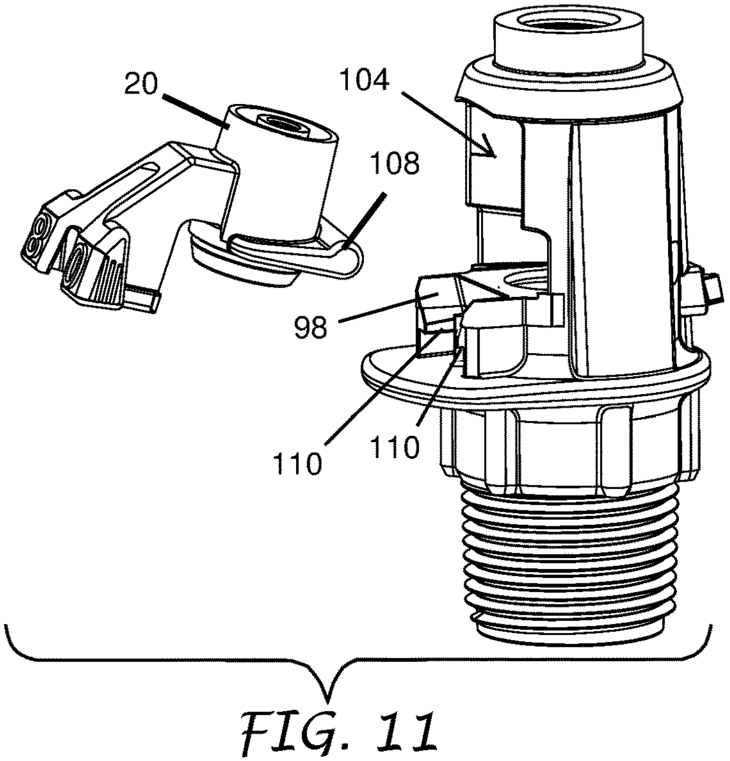
FIG. 11 is similar to FIG. 10 except the retainer and the seal of the nozzle assembly has been inserted into the body prior to insertion of the nozzle into the body according to a second assembly process.
Figure 12:
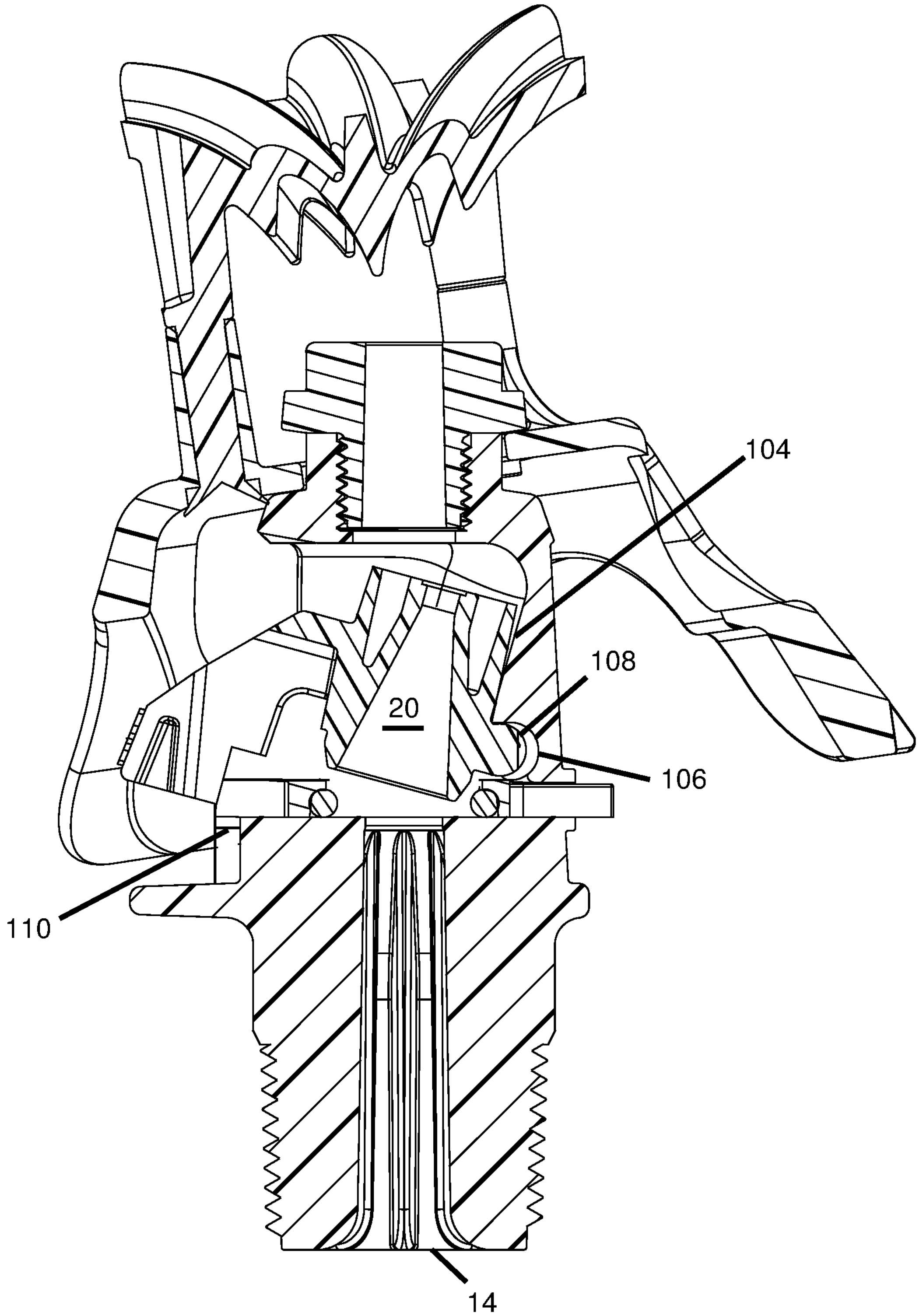
FIG. 12 is similar to FIG. 7 except it shows the nozzle being assembled to the retainer and the seal by tilting the nozzle after the retainer and the seal have already been installed in the body according to the second assembly process.

FIG. 11 is similar to FIG. 10 except the retainer 22 and the seal 26 of the nozzle subassembly 102 has been inserted into the body 16 prior to insertion of the nozzle 20 into the body 16 according to a second assembly process. FIG. 12 is similar to FIG. 7 except it shows the nozzle 20 being assembled to the retainer 22 and the seal 26 by tilting the nozzle 20 after the retainer 22 and the seal 26 have already been installed in the body 16 according to the second assembly process.

FIGS. 11 and 12 show that the nozzle 20 can alternatively be installed in the cavity 104 after the retainer 22 and the seal 26 are attached to the body 16. As shown in FIG. 11, the user can first tilt the nozzle 20 to an angle that will allow the nozzle 20 to slide over the retainer 22 as the user inserts it into the cavity 104. As best seen in FIG. 12 in certain embodiments, the cavity 104 can include a notch 106. The notch 106 can provide space for the nozzle 20 to be inserted into the cavity 104 at an angle as illustrated in FIG. 11. In some embodiments, the notch 106 is in the form of a recessed cavity.

In certain embodiments, when the nozzle 20 is fully inserted into the cavity 104, a hub 108 on the nozzle 20 is confined by the notch 106. The user can rotate the nozzle 20 in a downward direction towards the inlet 14 using the hub 108 as a pivot within the notch 106. As the user rotates the nozzle 20 downward, the tabs 28, 30 of the nozzle 20 can initially slide against the sloped surfaces 98, 100 as the tabs 28, 30 pass between the flaps 94, 96 slightly compressing the tabs 28, 30 together. The user can continue to rotate the nozzle 20 until the tabs 28, 30 pass by the locking bars 110.

When the nozzle 20 is in the operating position, the tabs 28, 30 will spring to an outward locked position. In some cases, the combination of the hub 108 being confined in the notch 106 and the tabs 28, 30 latching to the locking bars 110 will keep the nozzle 20 in its proper orientation for normal usage of the sprinkler 10. When the nozzle 20 is in its operating position, it will be in the position best show in FIG. 7. in some cases, to remove the nozzle 20, a user can pinch the tabs 28, 30 together to release them from the locking bars 110 and tilt the nozzle upwards to then pull it out of the cavity 104.

Figure 13:
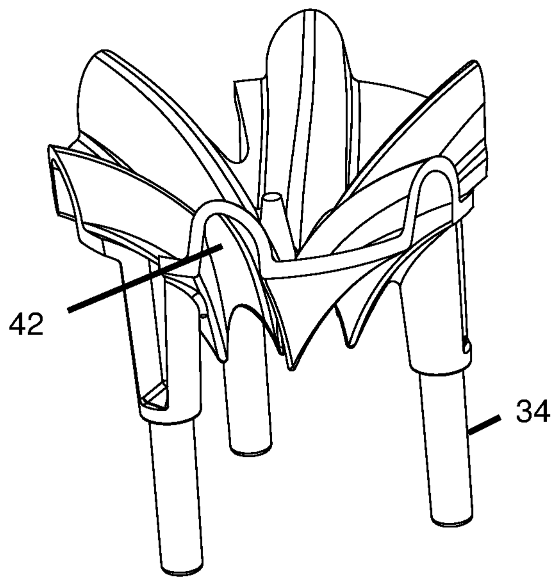
FIG. 13 is a top perspective view of the distribution plate of the sprinkler of FIG. 8 showing one or more water channels that have an asymmetric shape.
Figure 20:
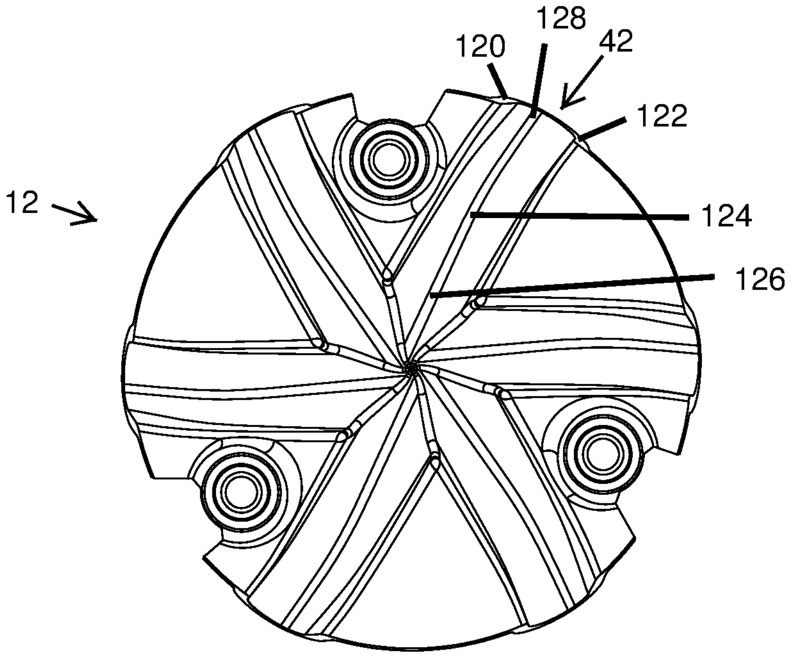
FIG. 20 is a bottom view of the distribution plate of FIG. 18 showing a leading edge of a radiused section of the one or more water channels have an asymmetric shape.

FIG. 13 is a top perspective view of the distribution plate 12 of the sprinkler 10 of FIG. 1 showing the one or more water channels 42 radially angled to cause the distribution plate 12 to rotate in a clockwise direction (see FIG. 6) when the water from the nozzle 20 impinges on the distribution plate 12. In some embodiments, the one or more water channels 42 are disposed on a downstream side of the distribution plate 12. The downstream side of the distribution plate 12 faces the nozzle 20. The one or more water channels 42 can channel the water exiting the nozzle 20 to be ejected in a controlled direction. In some embodiments, the one or more water channels 42 can be radially angled to cause the deflector assembly 38 to rotate when the water from the nozzle 20 impinges the distribution plate 12. In some embodiments, the one or more water channels 42 can be curved. In some embodiments, such as shown in FIG. 20, the one or more water channels 42 can be identical or substantially identical in shape.

Figure 14:
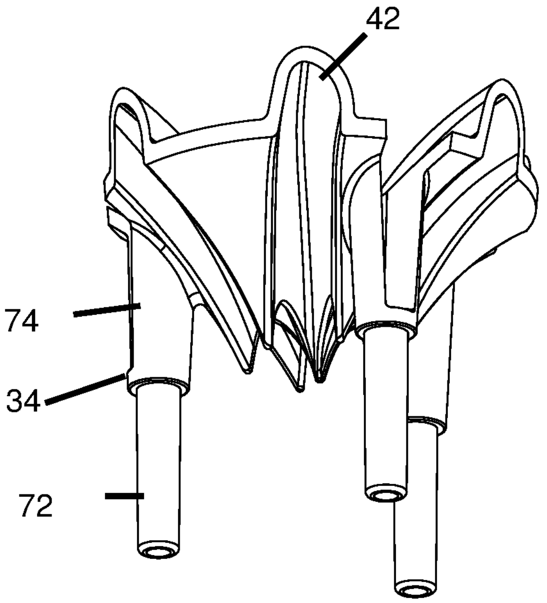
FIG. 14 is a bottom perspective view of the distribution plate of FIG. 13.

FIG. 14 is a bottom perspective view of the distribution plate 12 that shows an asymmetrical form of the one or more water channels 42. In certain embodiments, the one or more legs 34 of the distribution plate 12 attached to the base 58. In some embodiments, there can be two, three, four, or more legs 34. In the illustrated embodiment, there are three legs 34. In some embodiments, the legs 34 can have a larger diameter section 74 and a smaller diameter section 72.

Figure 15:
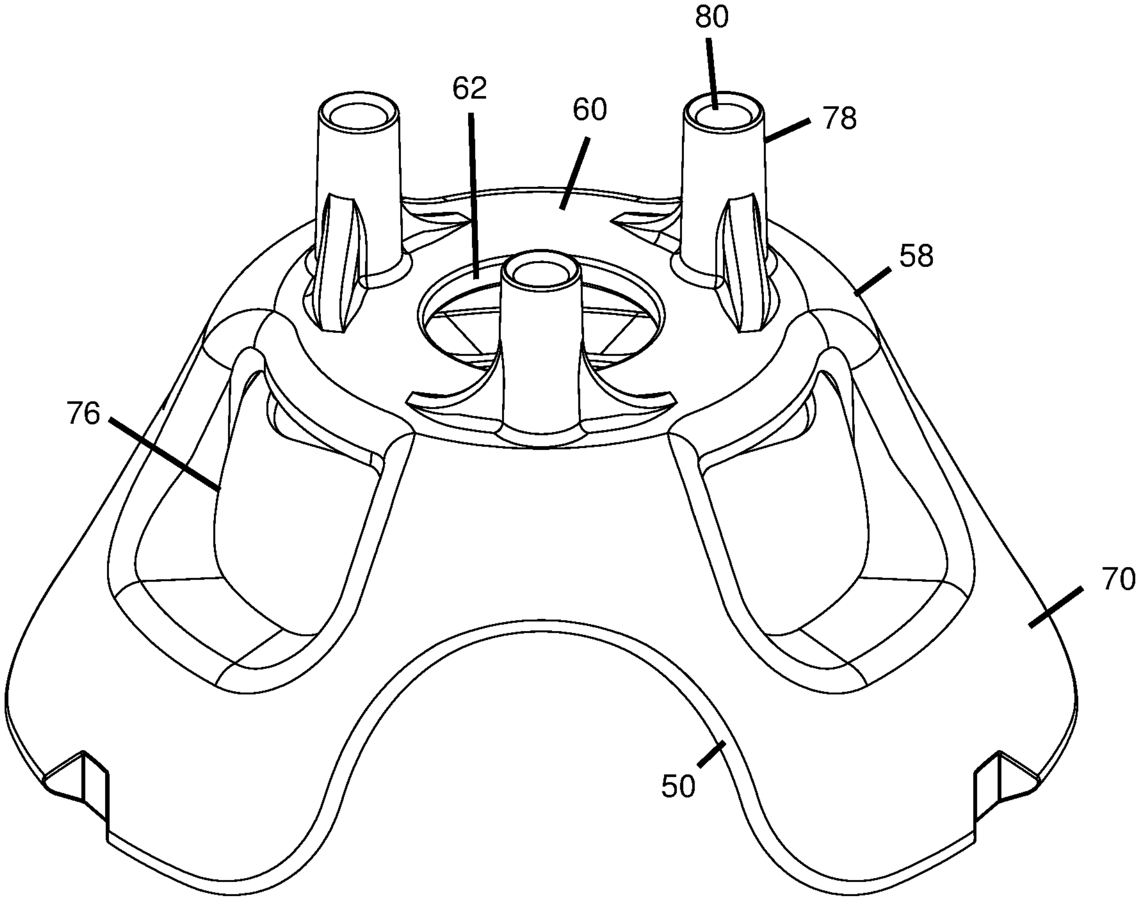
FIG. 15 is a top perspective view of the base of the sprinkler of FIG. 13.

FIG. 15 is a top perspective view of the base 58. In some embodiments, the base 58 can have one or more windows 76. The size, shape and number of the windows 76 can vary as required to achieve the desired mass for the base 58.

In some embodiments, the base 58 can incorporate one or more posts 78. In some embodiments, the base 58 can have two or more posts 78. In the illustrated embodiment, the base 58 can have three posts 78. In some embodiments, the one or more posts 78 can include a hole 80. In certain embodiments, the hole 80 can extend partially through the post 78. In certain embodiments, the hole 80 can extend entirely through the post 78. In certain embodiments, each hole 80 is sized and shaped to receive the smaller diameter section 72 of the one or more legs 34.

Figure 16:
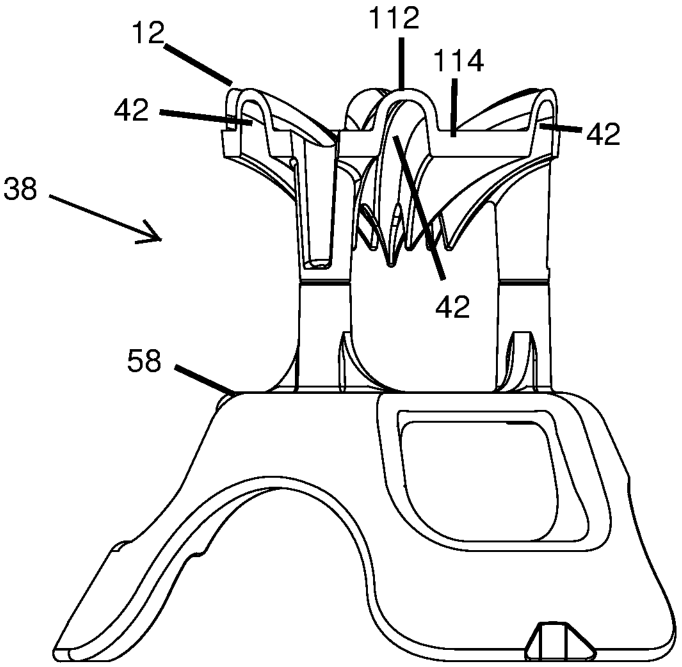
FIG. 16 is a front elevation view of a distribution plate similar to FIGS. 13 and 14 assembled to the base of FIG. 15 showing that the distribution plate has a variable thickness.

FIG. 16 is a front view of the deflector assembly 38. In certain embodiments, the deflector assembly 38 comprises the base 58 and the distribution plate 12. In some embodiments, the distribution plate 12 can be formed by a mold in a conventional manner resulting in the distribution plate 12 having a consistent wall thickness throughout the distribution plate 12. In some embodiments, the geometry is modified so that the thickness of the material varies in specific areas of the distribution plate 12. In certain embodiments, a first region of the distribution plate 12 has a first thickness and a second region of the distribution plate 12 has a second thickness. In other embodiments, the distribution plate 12 has regions with three or more different wall thicknesses. In this way, the distribution plate 12 can be manufactured with thicker or thinner cross sections.

In certain embodiments, the distribution plate 12 can present various harmonic characteristics that can negatively affect the quality of the sprinkler's performance. It has been found that varying the mass of the distribution plate 12 can reduce or eliminate the harmonics developed during normal operation. For example, testing has shown that adding mass in particular areas of the distribution plate 12 can have the positive effect of reducing or eliminating negative or undesirable harmonic properties during normal operation. In certain embodiments, a wall thickness in the particular areas of the distribution plate 12 is increased to add mass at that particular area. In certain embodiments, mass is increased in the particular areas by co-molding materials that have a different density to form the distribution plate 12. In certain embodiments, the distribution plate 12 can be manufactured to have the additional mass at the particular areas or the mass can be added to the distribution plate 12 after its manufacture.

In the illustrated embodiment, the distribution plate 12 comprises a web 114 located between curved surfaces 112 of the adjacent water channels 42. In certain embodiments, mass is increased at the web 114 by, for example, locally co-molding and/or increasing the wall thickness in the region of the web 114. For example, the wall thickness in the particular area of the web 114 can be increased as compared to the wall thickness of the curved surfaces 112. In the illustrated embodiment, the wall thickness of the curved surfaces 112 of the one or more water channels 42 is formed with a thinner cross section than the web 114 that connects between the water channels 42. The added mass to the web 114 between the water channels 42 can have the positive effect of reducing or eliminating negative or undesirable harmonic properties during normal operation of the sprinkler 10. In certain embodiments, the mass is attached to the web 114 in the form of a weight or other structure.

Figure 17:
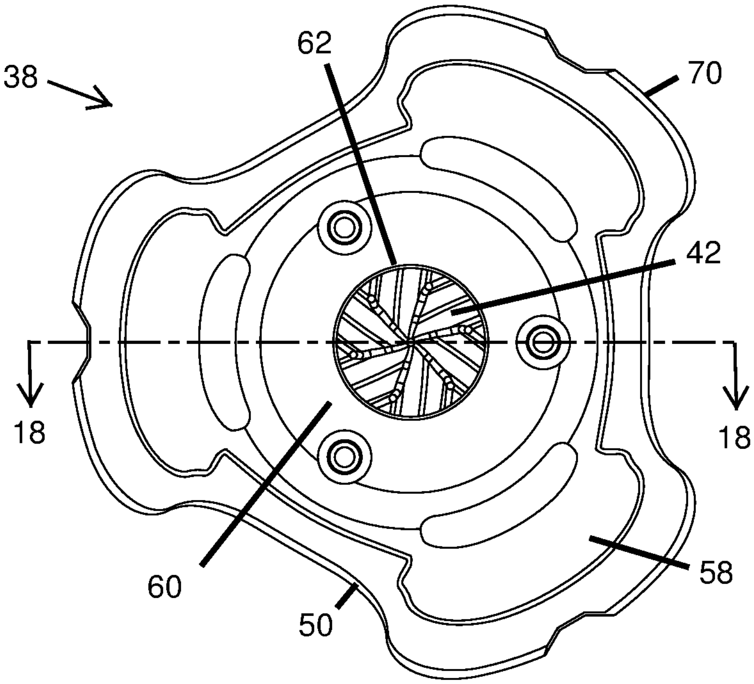
FIG. 17 is a bottom view of the distribution plate and the base of FIG. 16.
Figure 18:
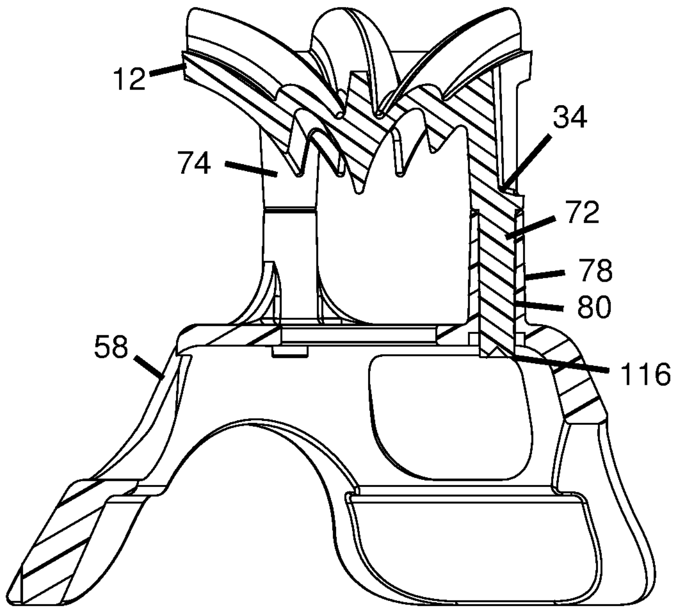
FIG. 18 is a cross-sectional view taken along cut-plane 18-18 of FIG. 17 and shows a plurality of legs of the distribution plate being inserted through corresponding holes in the base.

FIG. 17 is a bottom view of the deflector assembly 38 showing a portion of the one or more water channels 42 as viewed through the bore 62 in the base 58. FIG. 18 is a cross-sectional view of the deflector assembly 38 as viewed along the cut-plane 18-18 of FIG. 17. In certain embodiments, the deflector assembly 38 is assembled by inserting the smaller diameter sections 72 of the one or more legs 34 of the deflector plate 12 into holes 80 in the base 58. In some cases, the one or more legs 34 can be sized to achieve a loose fit, a slip fit, or a press fit when inserted into the respective hole 80.

In some embodiments, each of the one or more legs 34 can have an end 116. In some embodiments, the end 116 can include features such as a hole, cone, or threads. In some cases, the end 116 can be larger than the smaller diameter section 72 of the leg 34. In some cases, the end 116 can be smaller than, or the same size as the diameter of the smaller diameter section 72 of the leg 34. In certain embodiments, the one or more legs 34 can be retained in the holes 80 by a screw, ultrasonic welding, adhesive, or other suitable attachment method.

Figure 18A:
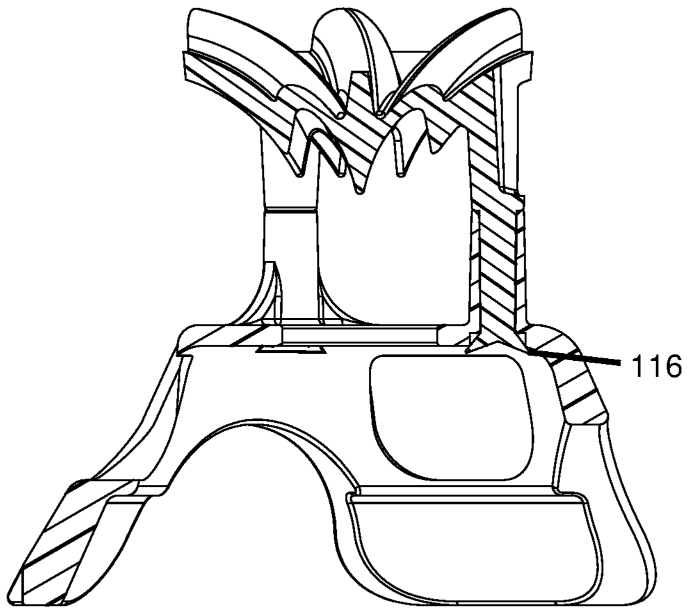
FIG. 18A is similar to FIG. 18 except that a distal end of one of the plurality of legs has been deformed to inhibit the distribution plate from being disassembled from the base.

As best seen in FIG. 18A in comparison to FIG. 18, the illustrated embodiment of the deflector assembly 38 is held together by the end 116 of the leg 34 expanding or deforming after the leg 34 is inserted into the hole 80 of the base 58. In FIG. 18, the ends 116 of the one or more legs 34 have not yet expanded or deformed to prevent the leg 34 from being retracted from the hole 80. In some embodiments, the end 116 can be deformed using pressure, heat, ultrasonic vibration, orbital forming or any combination of the above. In certain embodiments, the end 116 is pinched together to fit the end 116 into the hole 80. Once the leg 34 is inserted a sufficient depth into the hole 80, the end 116 protrudes from the hole 80 and then naturally expands back to its original shape locking the leg 34 in the hole 80.

FIGS. 19 through 22 illustrate the distribution plate 12 with the water channels 42 having an asymmetrical shape. In certain embodiments, the cross-sectional shape of the one or more water channels 42 can be asymmetric. For example, a first side 120 of the water channel 42 can be nearly straight while an opposite second side 122 can be radiused. In certain embodiments, the cross-sectional shape of the one or more water channels 42 is asymmetric across a vertical line passing through a vertex or bottom of the water channel 42. In certain embodiments, the cross-sectional shape of the one or more water channels 42 is asymmetric across a vertical line passing through a midpoint of a width of the water channel 42 as measured at the top of the water channel 42.

In certain embodiments, the one or more water channels 42 can have an exit geometry that comprises one or more arcs on a first side of the vertex that have different degrees of curvature than one or more opposite arcs on a second side of the vertex. For example, an arc on the first side 120 can have a degree of curvature different than a degree of curvature of an arc on the opposite second side 122 relative to the vertex. In certain embodiments, the one or more water channels 42 can have an exit geometry that comprises one or more arcs on the first side 120 of the midpoint that have different degrees of curvature than one or more opposite arcs on the second side 122 of the midpoint. For example, an arc on the first side 120 can have a degree of curvature different than a degree of curvature of an arc on the opposite second side 122 relative to the midpoint.

Figure 19:
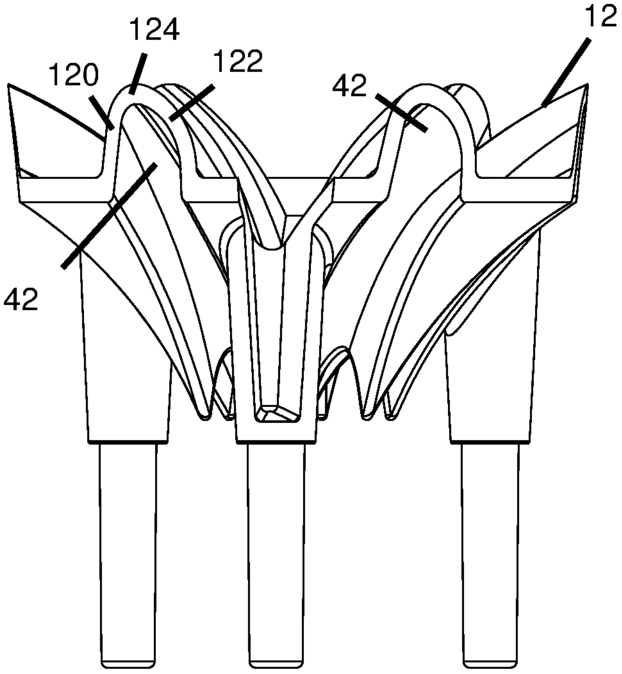
FIG. 19 is a front view of the distribution plate from FIG. 8 showing a cross-sectional shape of the one or more water channels is asymmetric.

As is illustrated in FIG. 19, the water channel 42 can have an exit geometry that is near straight on one side, such as the first side 120, and radiused on the opposite second side 122. In certain embodiments, a radiused section 124 can blend the first side 120 and the opposite second side 122 together in an off center arrangement relative to the cross-sectional shape of the exit.

FIG. 20 is a bottom view of the distribution plate 12 illustrating the first side 120, the second side 122 and the radiused section 124. In certain embodiments, near a center of the distribution plate 12, a leading edge 126 of the radiused section 124 is centered, or close to centered relative to the midpoint of the water channel 42. Near the outer edge of the distribution plate 12 or exit 128, the leading edge 126 of the radiused section 124 gradually moves away from the center of the water channel 42, or closer to the first side 120 of the water channel 42. In certain embodiments, the radiused section 124 follows an arcuate path between the center of the distribution plate 12 and the outer edge of the distribution plate 12.

Figure 21:
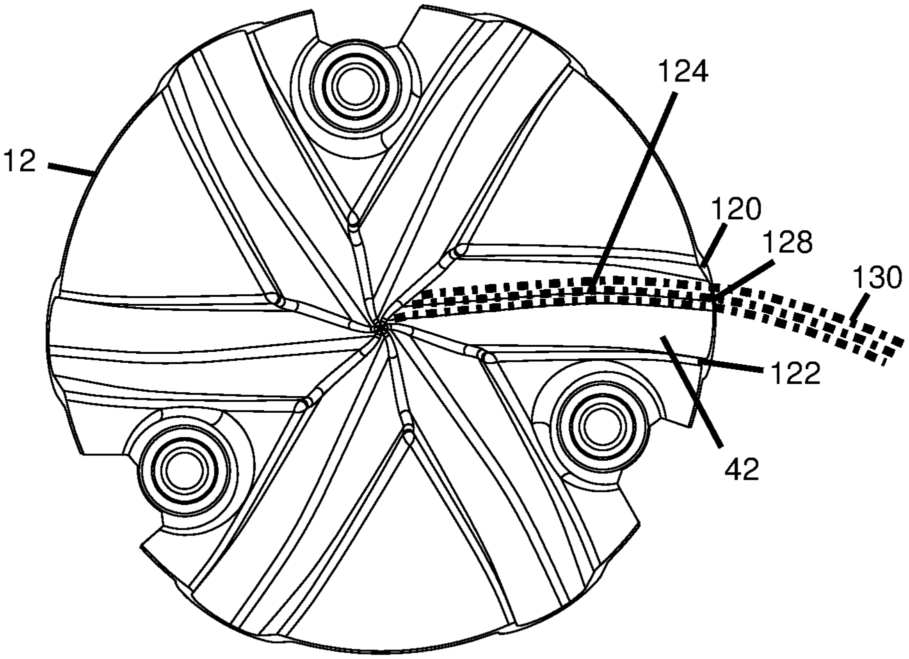
FIG. 21 is similar to FIG. 20 and shows a water flow path through one of the water channels when the nozzle inserted into the body has a small water flow path.

FIG. 21 illustrates an approximate water path 130 of the sprinkler 10 when the nozzle 20 has a small diameter or a small water flow path. When the nozzle 20 has the small diameter, the asymmetrical shape of the water channel 42 can provide a smaller or reduced cross-section for the water to flow through. This smaller cross-section can improve the uniformity of the stream of water leaving the water channel 42 at the exit 128 in comparison with a traditional symmetric channel such as a U-shaped water channel. Additionally, the asymmetrical shape of the water channel 42 can direct the small stream of water along the water path 130 in a direction that moves the water path 130 from the midpoint or center of the water channel 42 to be closer to the first side 120 at the exit 128. This movement of the water path 130 along the distribution plate 12 can increase the drive or rotational force the water stream applies against the distribution plate 12 as compared to a traditional symmetric water channel. This added drive force can help the distribution plate 12 and the deflector assembly 38 to operate more reliability and at a desirable speed of rotation when a relatively small amount of water is flowing from the nozzle 20.

Figure 22:
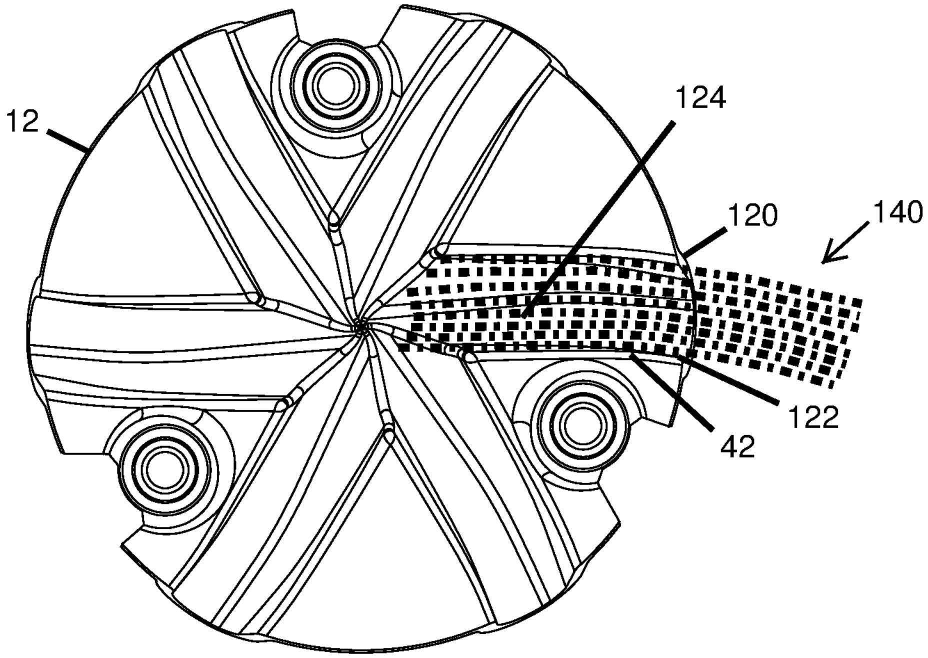
FIG. 22 is similar to FIG. 21 and shows a water flow path through the same water channel when the nozzle inserted into the body has a larger water flow path than the flow path of the nozzle from FIG. 21.
Figure 23:
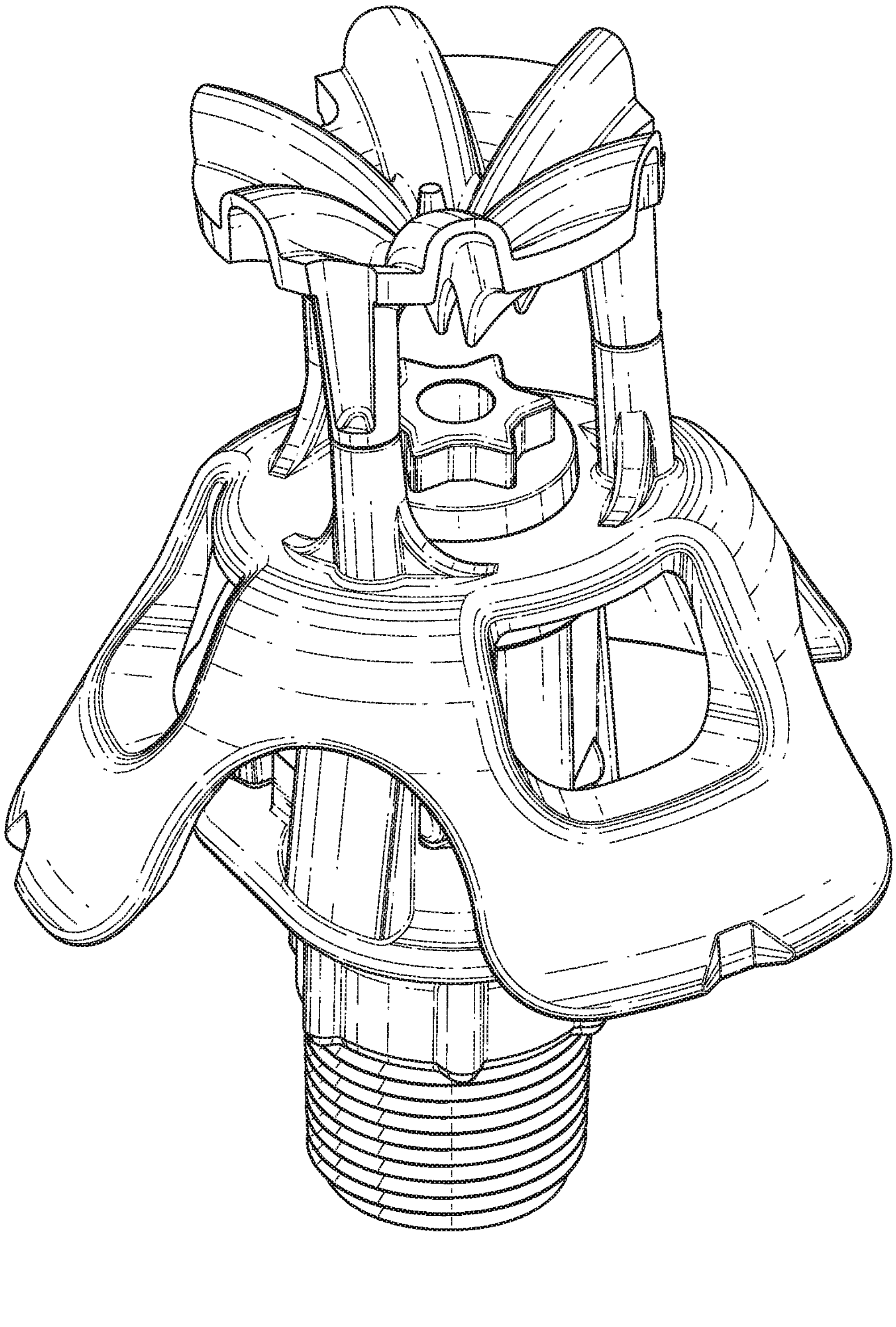
FIG. 23 is a top, side perspective view of an embodiment of a sprinkler.
Figure 24:
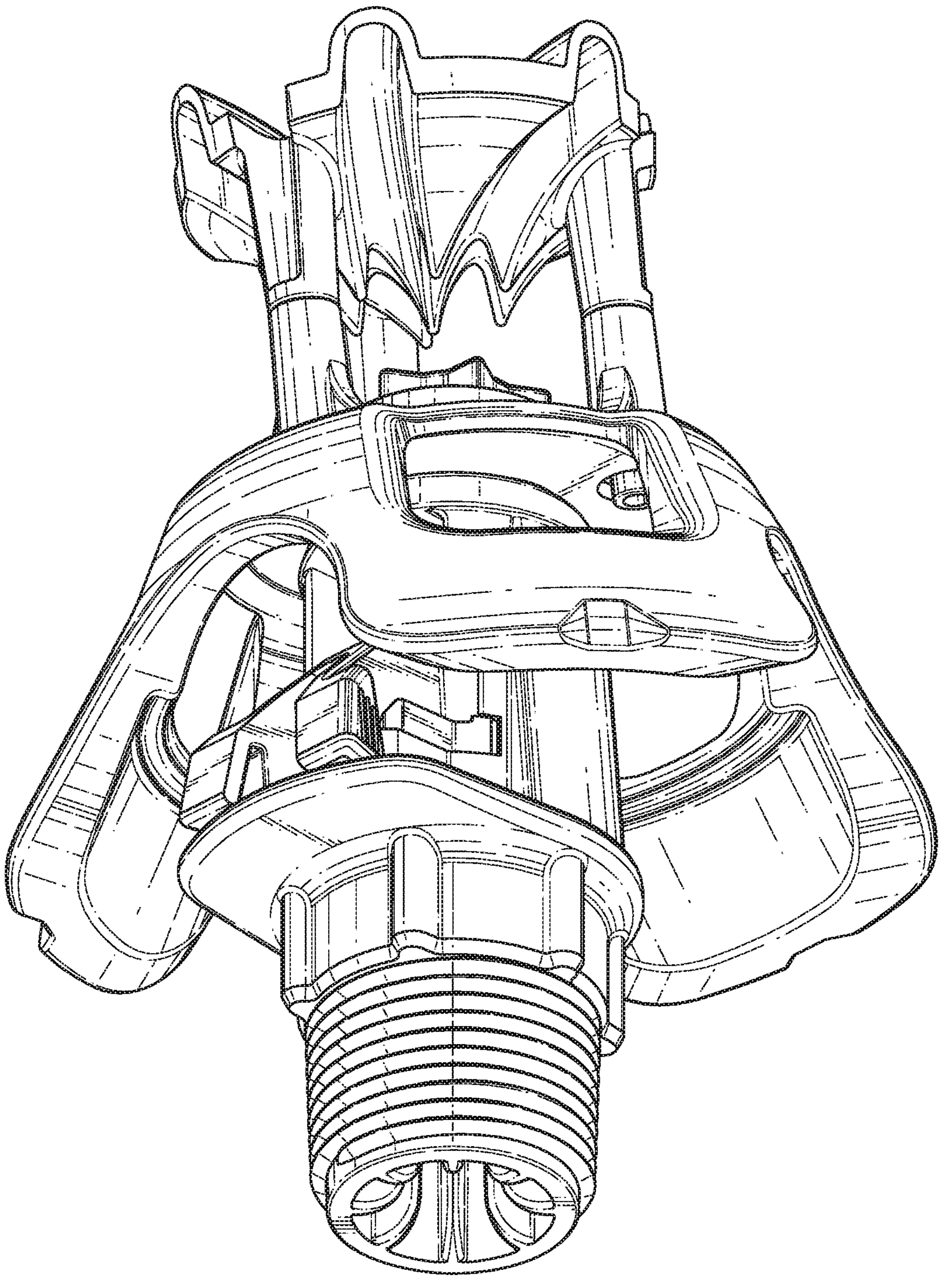
FIG. 24 is a bottom, side perspective view of the sprinkler of FIG. 23.
Figure 25:
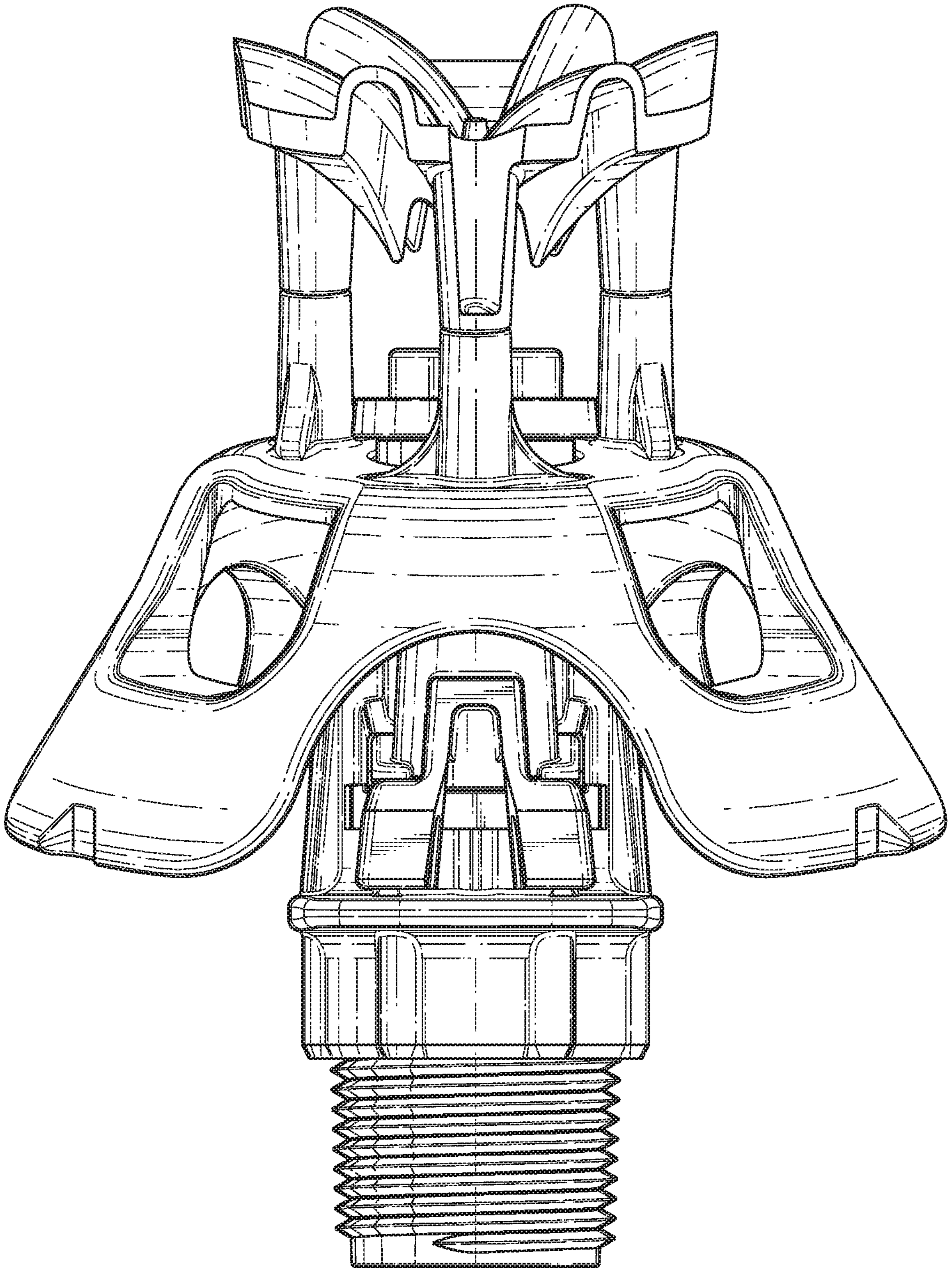
FIG. 25 is a front plan view of the sprinkler of FIG. 23.
Figure 26:
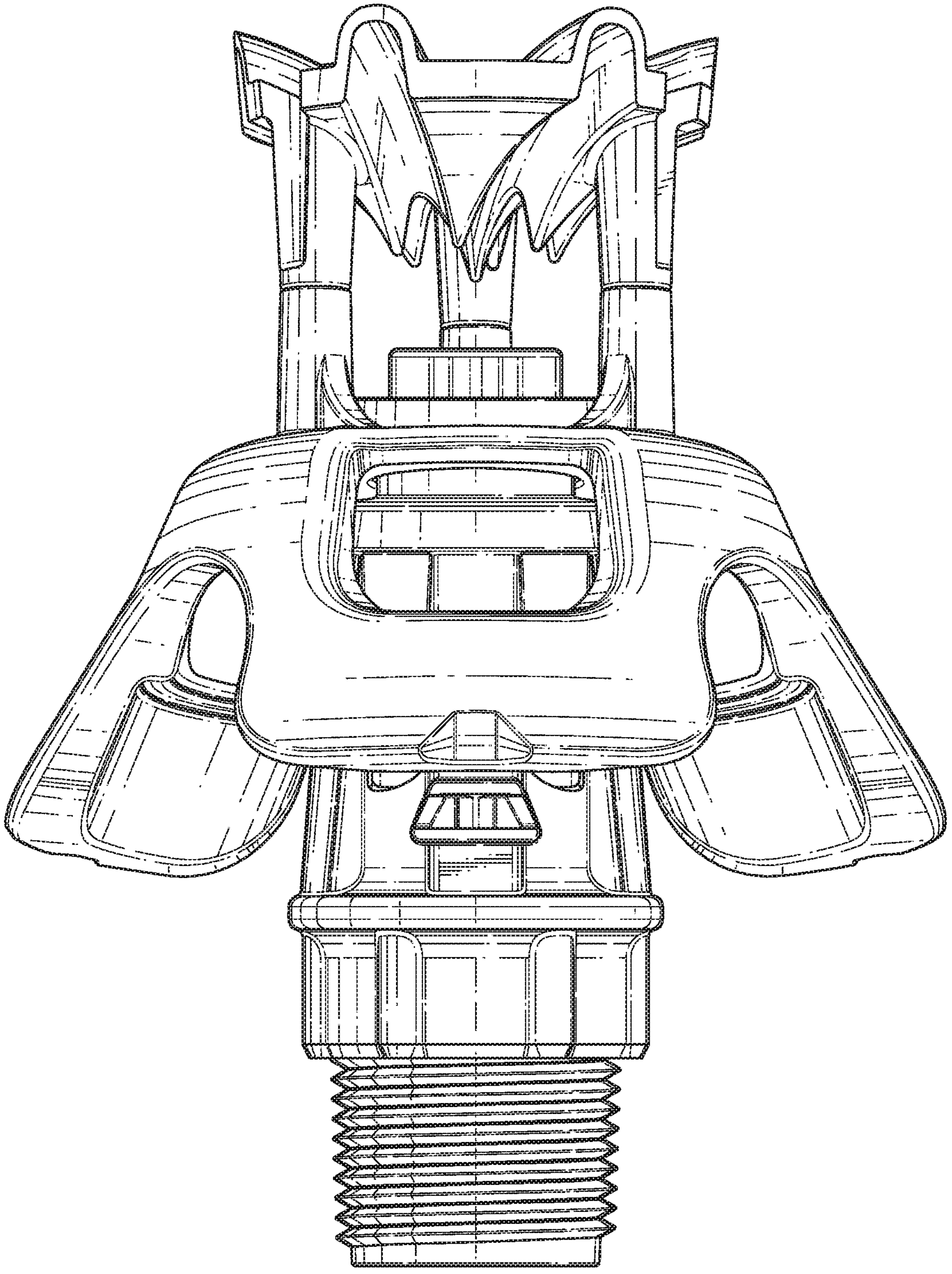
FIG. 26 is a back plan view of the sprinkler of FIG. 23.
Figure 27:
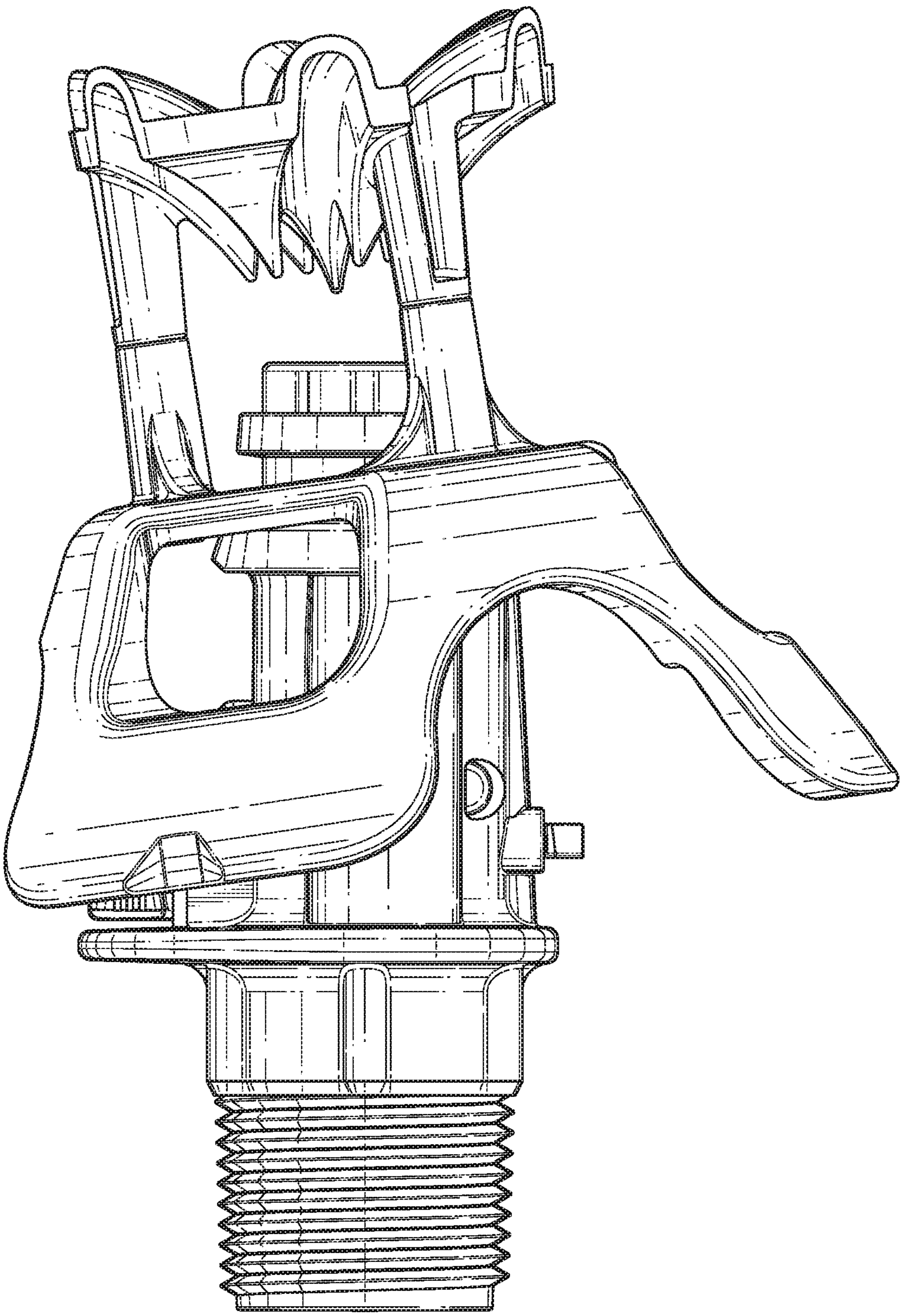
FIG. 27 is a left side plan view of the sprinkler of FIG. 23.
Figure 28:
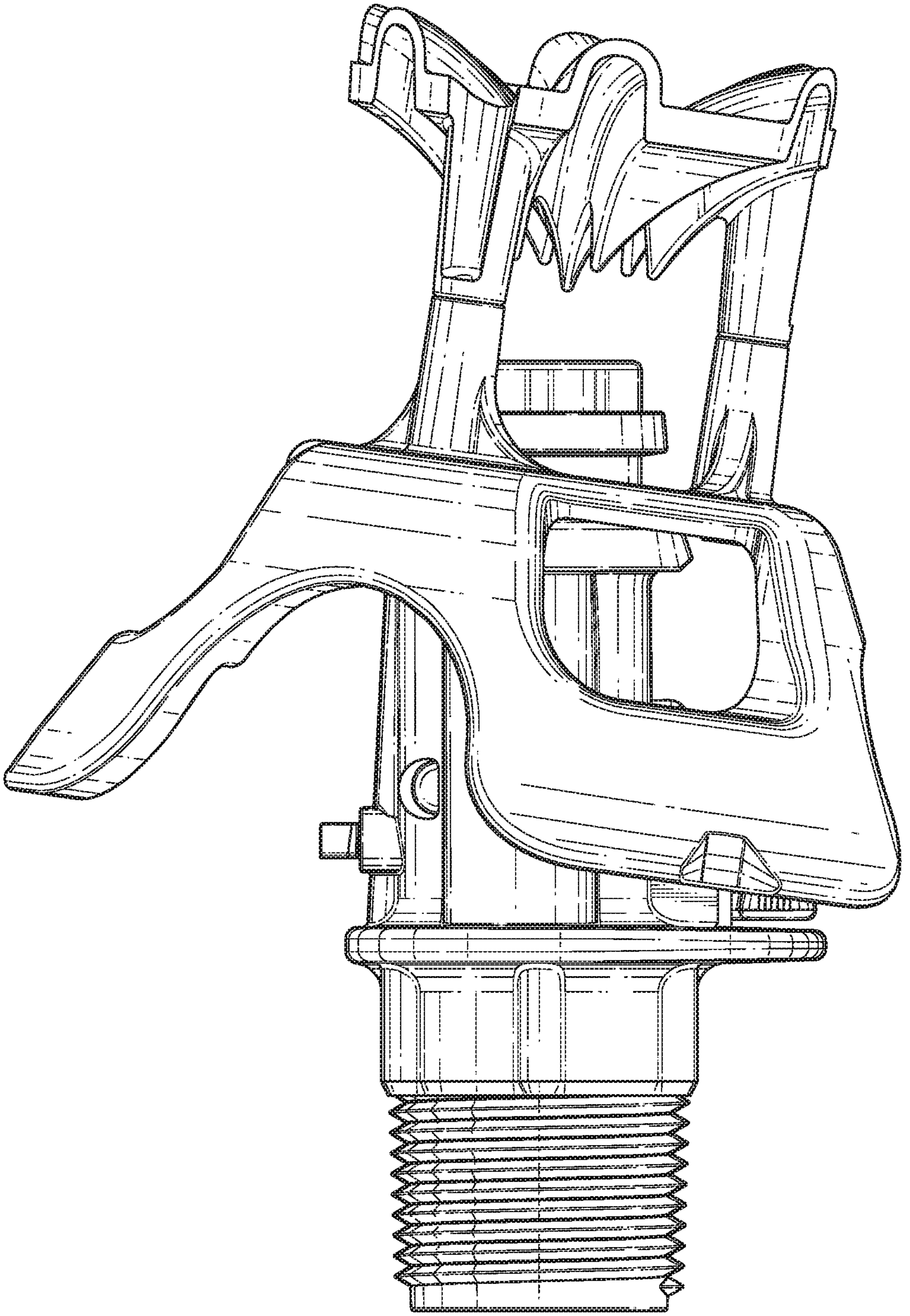
FIG. 28 is a right side plan view of the sprinkler of FIG. 23.
Figure 29:
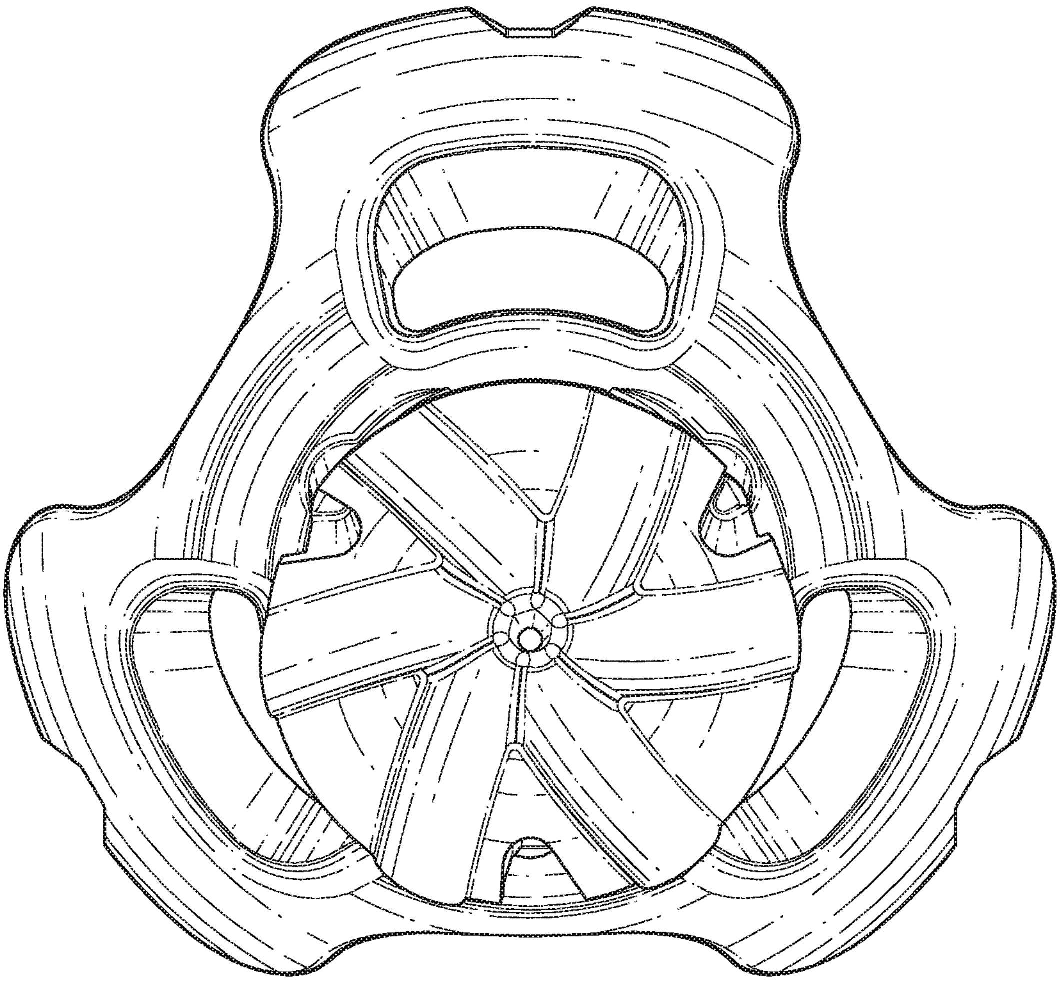
FIG. 29 is a top plan view of the sprinkler of FIG. 23.
Figure 30:
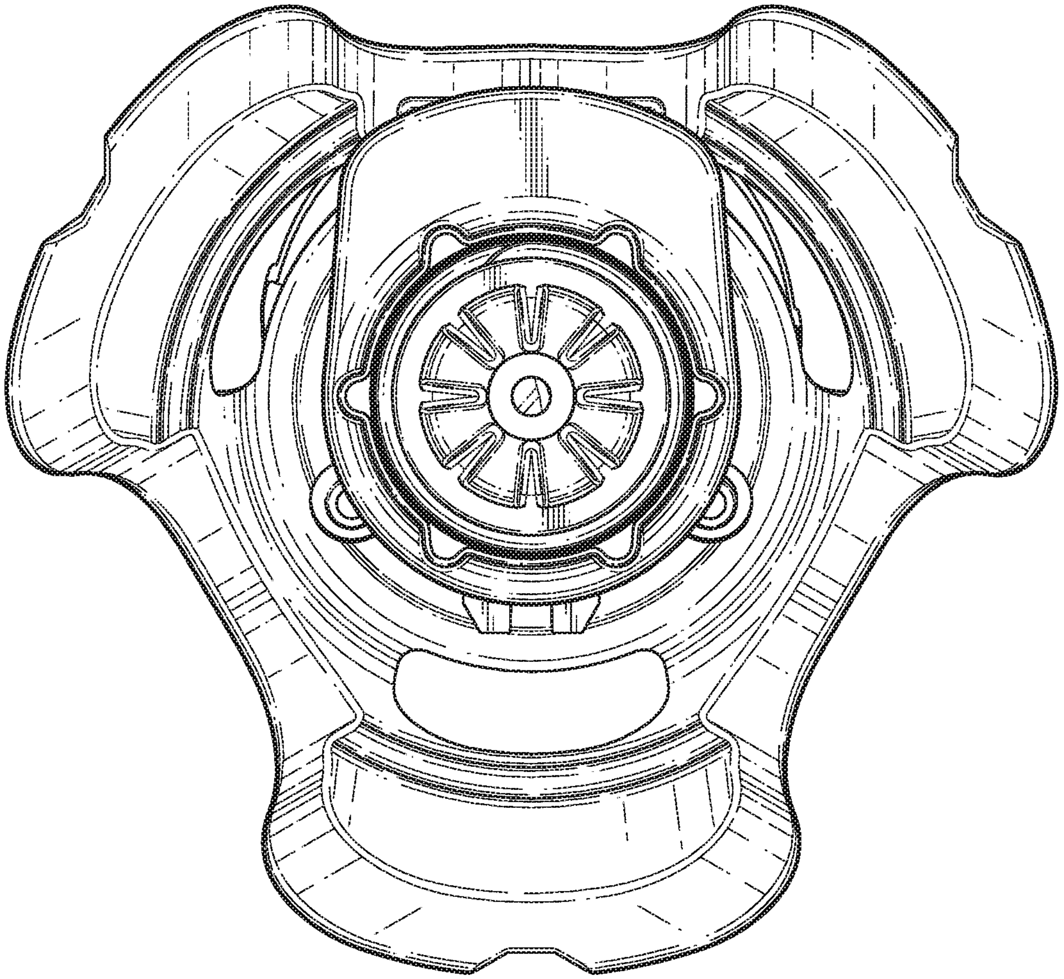
FIG. 30 is a bottom plan view of the sprinkler of FIG. 23.
Figure 31:
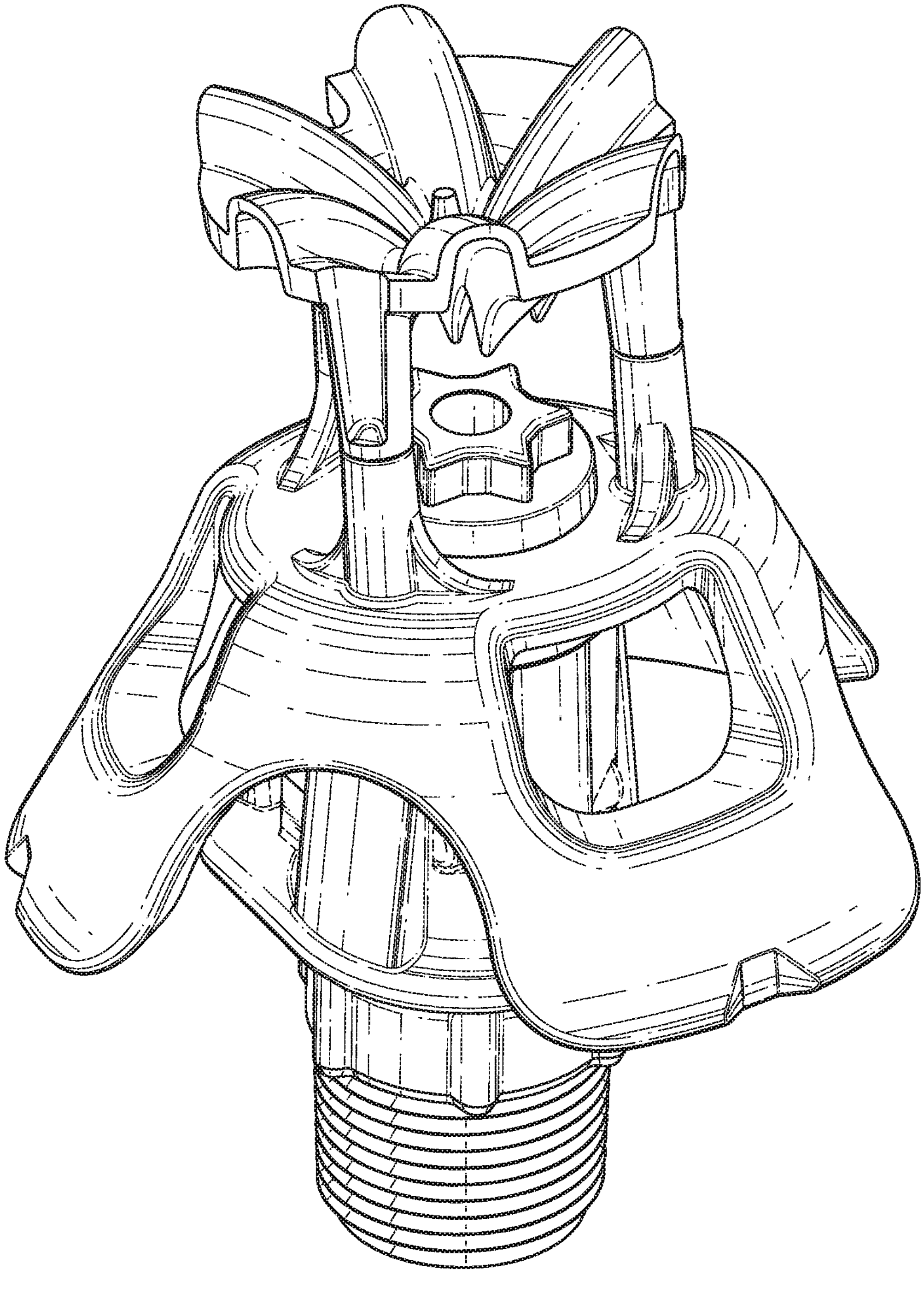
FIG. 31 is a top, side perspective view of an embodiment of a sprinkler wherein broken lines are used to illustrate features of the sprinkler which may or may not form part of the design, depending on the embodiment.
Figure 32:
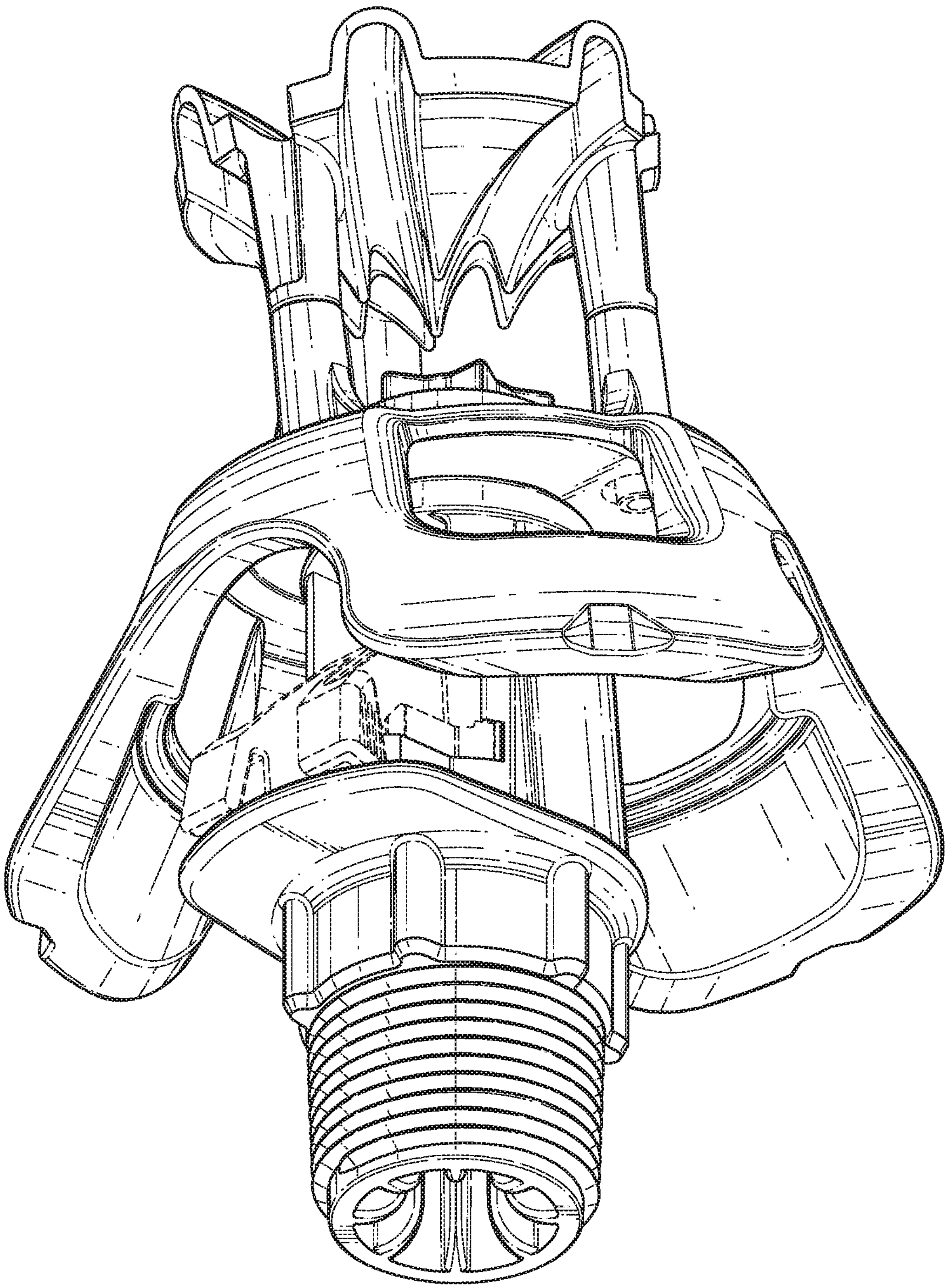
FIG. 32 is a bottom, side perspective view of the sprinkler of FIG. 31.
Figure 33:
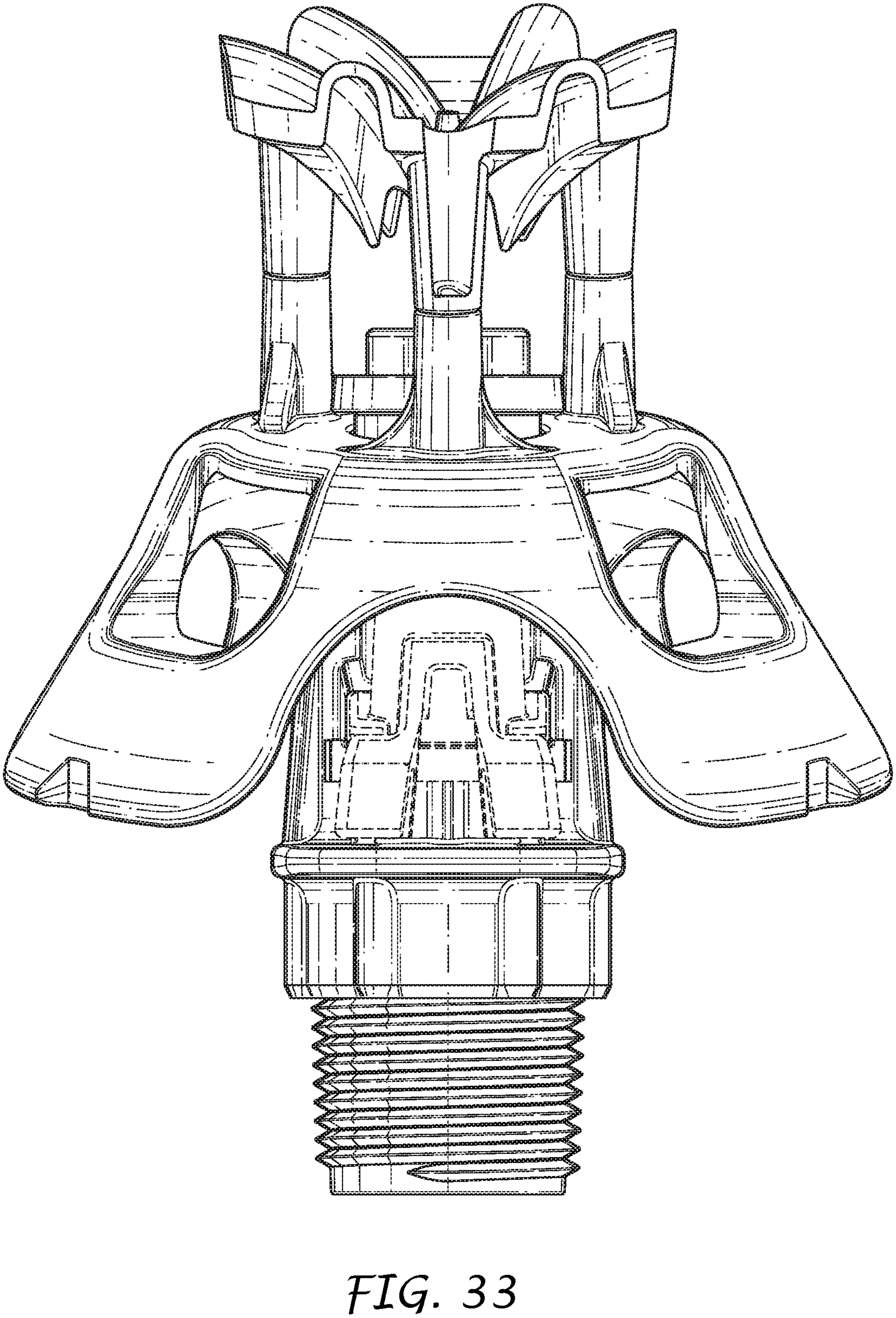
FIG. 33 is a front plan view of the sprinkler of FIG. 31.
Figure 34:
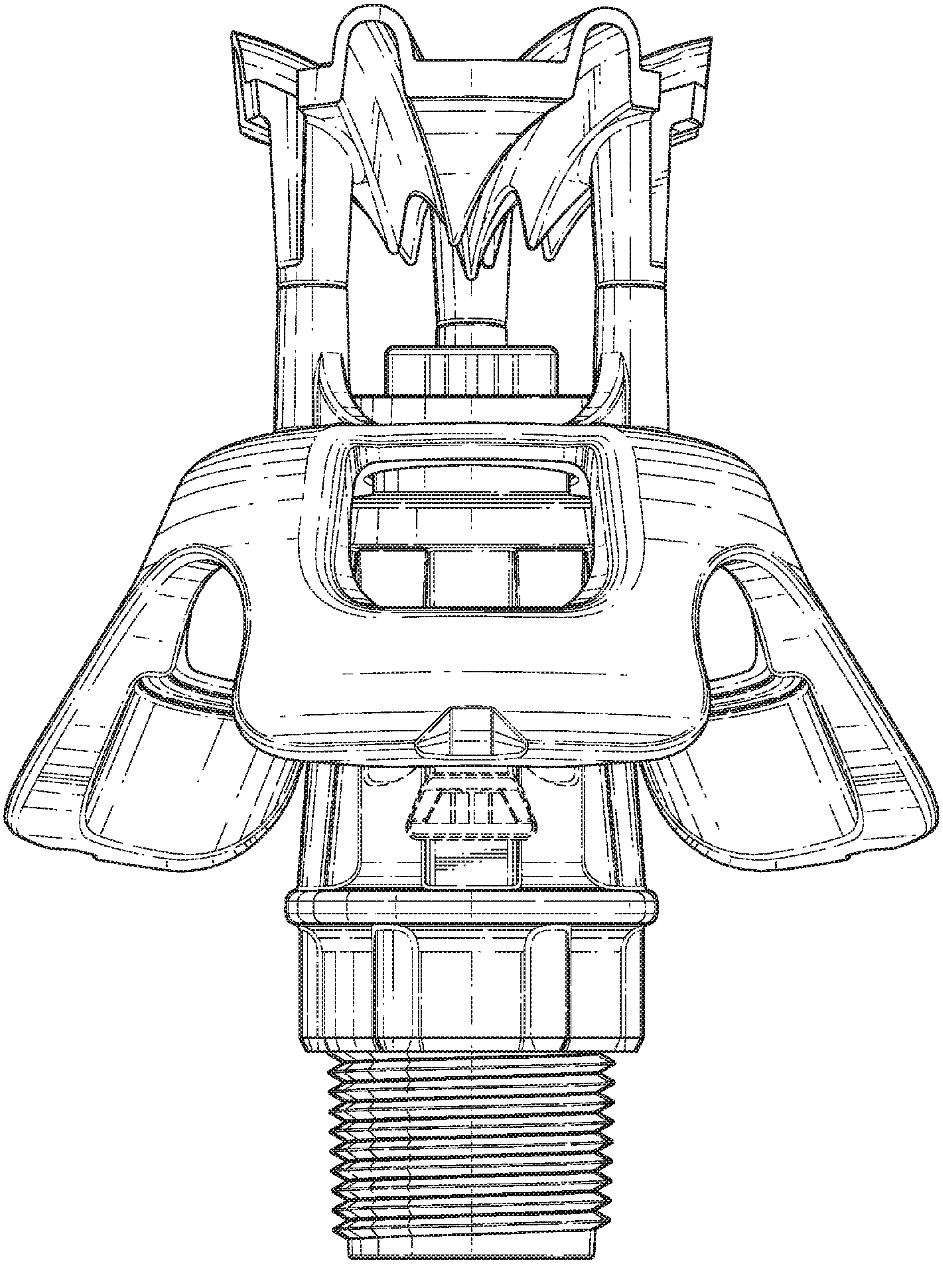
FIG. 34 is a back plan view of the sprinkler of FIG. 31.
Figure 35:
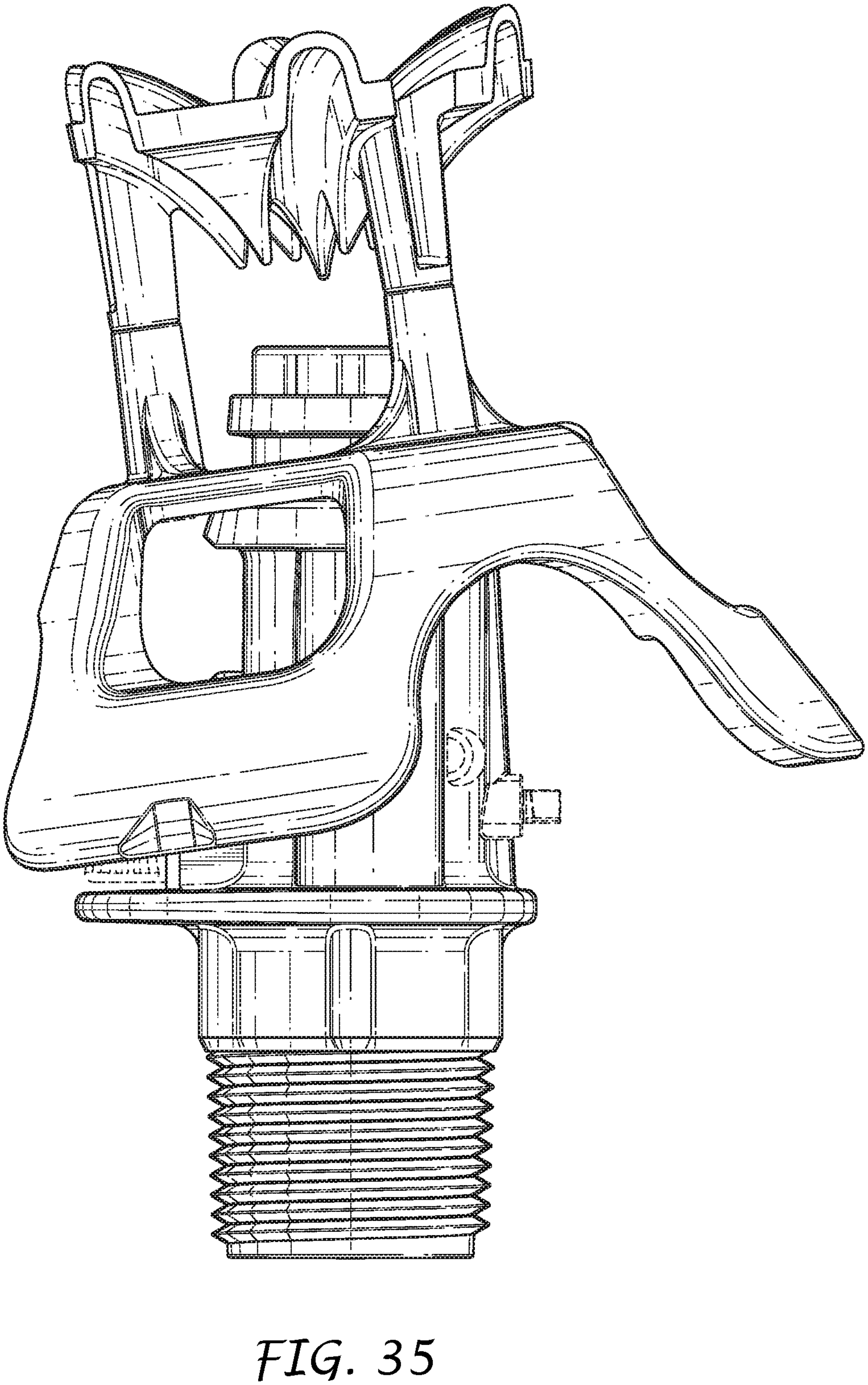
FIG. 35 is a left side plan view of the sprinkler of FIG. 31.
Figure 36:
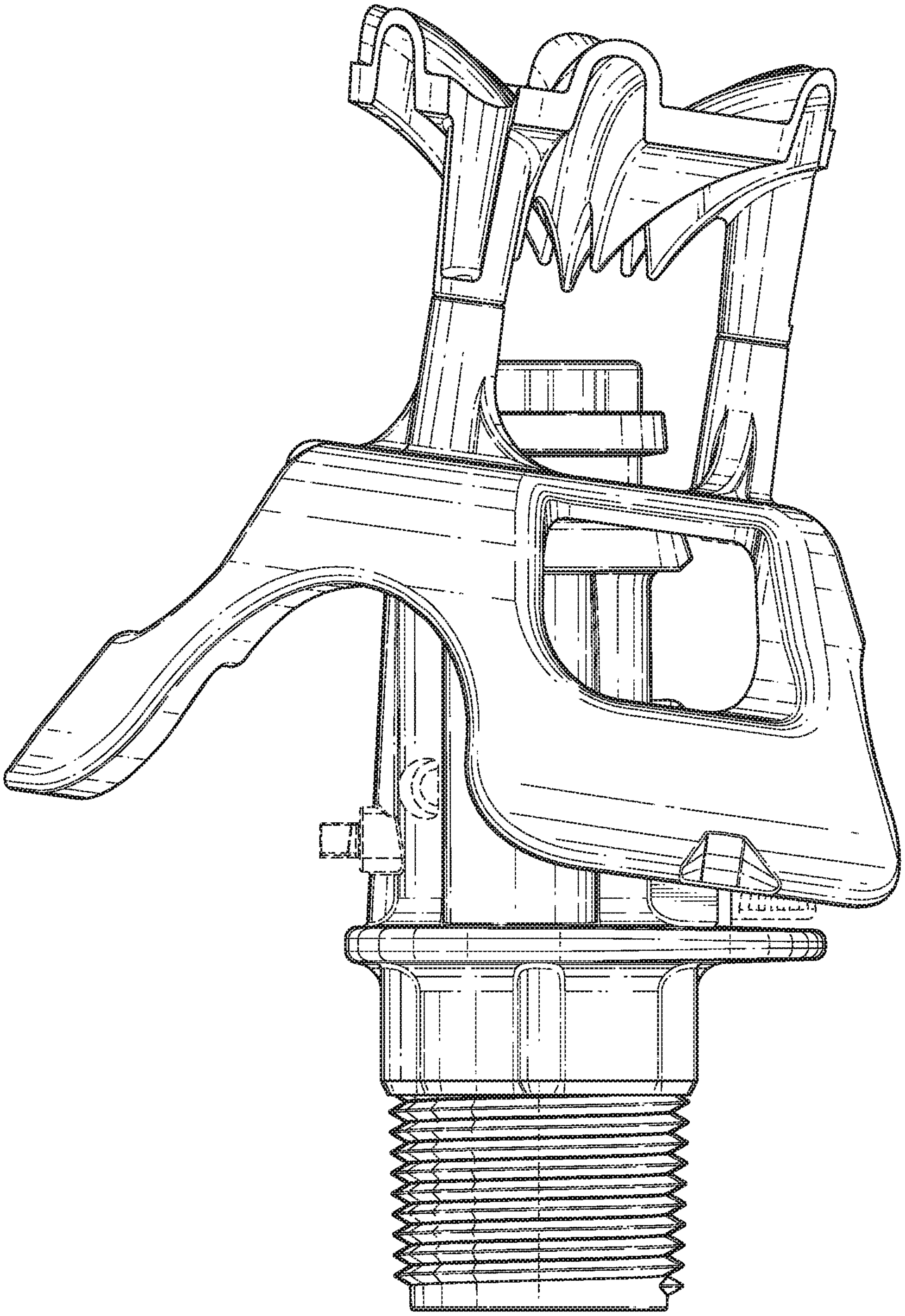
FIG. 36 is a right side plan view of the sprinkler of FIG. 31.
Figure 37:
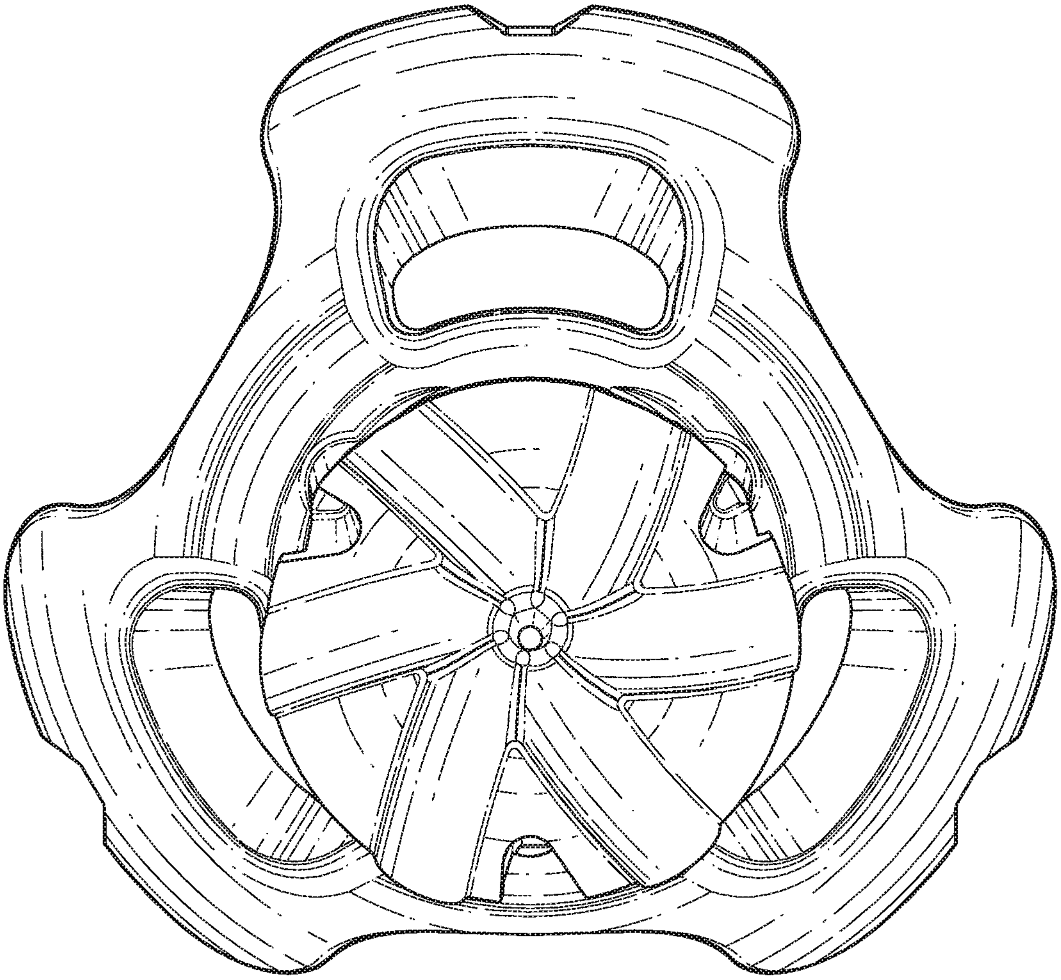
FIG. 37 is a top plan view of the sprinkler of FIG. 31.
Figure 38:
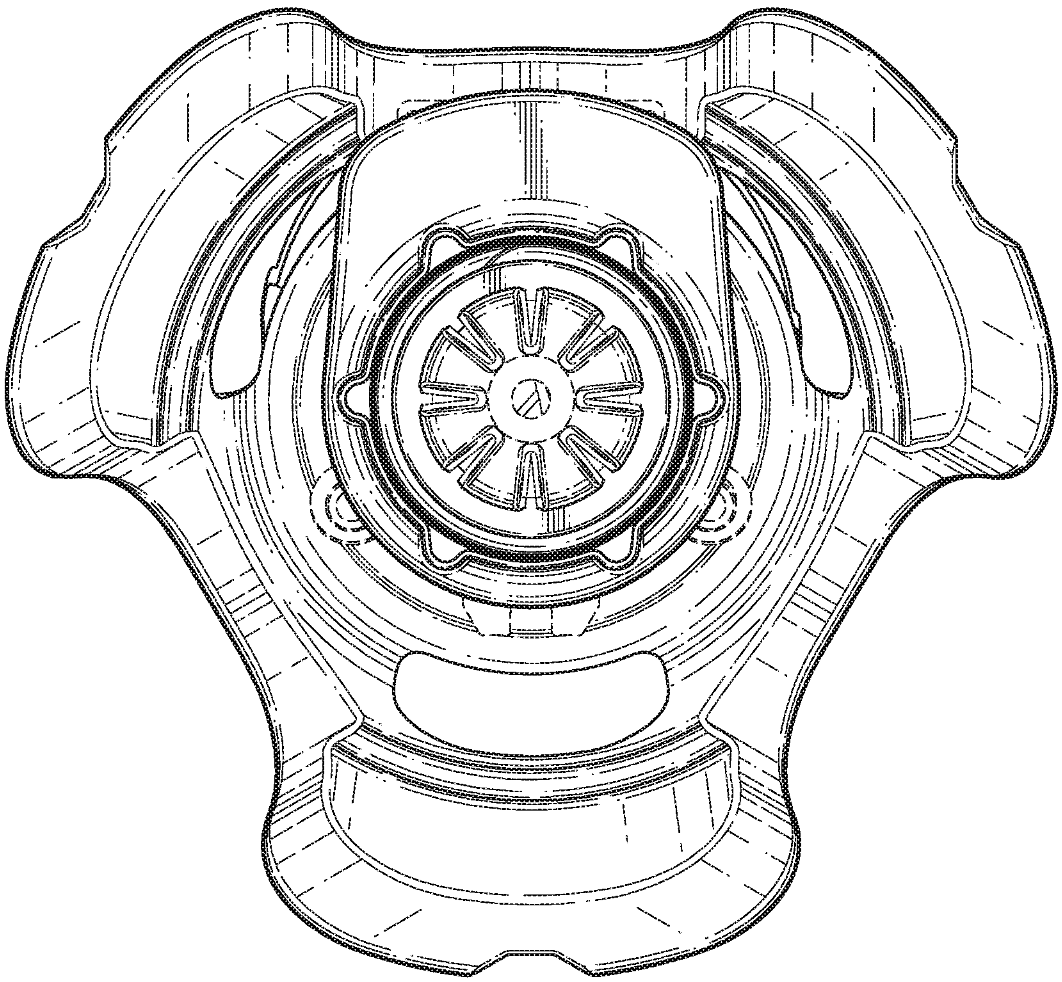
FIG. 38 is a bottom plan view of the sprinkler of FIG. 31.

FIG. 22 illustrates an approximate water path 140 of the sprinkler 10 when the nozzle 20 has a large diameter or larger water flow path. When the nozzle 20 has the large diameter, the asymmetrical shape of the water channel 42 can provide a larger or increased cross-section for the water to flow through. Additionally, the asymmetrical shape of the water channel 42 can direct a majority of the large stream of water along the water path 140 in a direction that is generally parallel with the wall 120, which provides an adequate drive or rotational force to the distribution plate 12. With the majority of the water stream flowing generally parallel to the first side 120, the relatively large stream of water can provide adequate drive force to the distribution plate 12 without over driving the distribution plate 12, or otherwise causing the distribution plate 12 to operate at a greater than desired rotational speed. Without the water channel 42 having the asymmetrical shape, the distribution plate 12 and the deflector assembly 38 may have either too little drive force when the nozzle 20 has a small diameter or too much drive force when the nozzle 20 has a larger diameter. The asymmetrical shape of the water channel 42 allows the distribution plate 12 to achieve a desirable speed of rotation that optimizes the performance of the sprinkler 10 for multiple sizes of nozzle 20.

FIGS. 23 to 38 illustrate various embodiments of sprinklers. Various attributes of the sprinklers are shown in broken lines to illustrate that they may or may not be present and that their position, orientation, shape, style, number, etc. can be different according to the different embodiments. The broken lines form no part of the designs. For example, FIGS. 31-38 show a sprinkler with a nozzle 20 in broken lines. The nozzle 20 is shown in broken lines to indicate that the nozzle 20 forms no part of the design.

Terminology

Although certain embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described above. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

For expository purposes, the term "horizontal" as used herein is defined as a plane parallel to the plane or surface of the floor or ground of the area in which the device being described is used or the method being described is performed, regardless of its orientation. The term "floor" can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Although the sprinkler has been disclosed in the context of certain embodiments and examples, it will be understood by those skilled in the art that the sprinkler and subassemblies extends beyond the specifically disclosed embodiments to other alternative embodiments and/or uses of the embodiments and certain modifications and equivalents thereof. For example, some embodiments are configured to operate oriented such that the distribution plate is positioned below the nozzle and the nozzle directs water downward. Accordingly, it is intended that the scope of the sprinkler herein-disclosed should not be limited by the particular disclosed embodiments described above, but should be determined only by a fair reading of the claims that follow.

What is claimed is:

1. A sprinkler assembly comprising:
- an inlet configured to receive water;
- a body supported by the inlet and having a confinement structure;
- a nozzle supported by the body and disposed downstream of the inlet, the nozzle being in fluid communication with the inlet and configured to direct the water out of the nozzle along an axis; and
- a deflector assembly having a base and a distribution plate, a portion of the base being disposed in the confinement structure to allow the deflector assembly to move with respect to the axis in at least a first rotational direction, the distribution plate comprising a plurality of channels on a side of the distribution plate facing the nozzle, at least one channel of the plurality of channels defining a water path having an entrance for receiving the water, an exit for distributing the water, and a leading edge and a pair of sides along a common length of the at least one channel in a direction towards the exit of the at least one channel, the water path having a first curved shape so as to impart lateral forces on the distribution plate in the first rotational direction,
- wherein the leading edge of the at least one channel has a second curved shape along the common length different from the first curved shape, the second curved shape moving closer to one of the pair of sides while moving away from another one of the pair of sides in the direction towards the exit, the second curved shape being sized to move flow of the water in a lateral direction away from a midpoint or center of the water path and in the first rotational direction so that at the exit the water path is closer to the one of the pair of sides than at the entrance as a volumetric rate of the flow of the water decreases, and
- wherein the one of the pair of sides has a degree of curvature that is different from a degree of curvature from the another one of the pair of sides in the direction towards the exit.

2. The sprinkler assembly of claim 1, wherein the at least one channel has a cross-sectional shape that is asymmetric across a vertical line passing through a vertex or bottom of the at least one channel.

3. The sprinkler assembly of claim 1, wherein the at least one channel has a cross-sectional shape that is asymmetric across a vertical line passing through a midpoint of a width of the at least one channel as measured at a top of the at least one channel.

4. The sprinkler assembly of claim 1, wherein a first distance measured between the leading edge and one of the one side of the pair of sides or the another one of the pair of sides at a first location along the at least one channel being different than a second distance measured between the leading edge and the one of the one side of the pair of sides or the another one of the pair of sides at a second location along the at least one channel, the first location being different than the second location.

5. The sprinkler assembly of claim 1, wherein the distribution plate further comprises a first region and a second region, a thickness of the first region being different than a thickness of the second region.

6. The sprinkler assembly of claim 1, wherein the distribution plate further comprises a web located between adjacent channels of the plurality of channels, the web having a wall thickness that is greater than a wall thickness of the adjacent channels.

7. The sprinkler assembly of claim 1, further comprising a retainer configured to be inserted in the body and between the nozzle and the inlet, the nozzle being removable from the body independent from removing the retainer from the body, the retainer being configured to support a seal at least when disposed in the body.

8. The sprinkler assembly of claim 7, wherein the retainer is further configured to engage with the nozzle so that the nozzle and the retainer can be removed from the body as a subassembly.

9. A sprinkler assembly comprising:
- an inlet configured to receive water;
- a body supported by the inlet and having a base retaining surface;
- a nozzle supported by the body and disposed downstream of the inlet, the nozzle being in fluid communication with the inlet and configured to direct the water out of the nozzle along an axis;
- a deflector assembly having a base and a distribution plate, the base comprising a first side and an opposite second side, the first side of the base being supported by the base retaining surface, the distribution plate comprising a plurality of channels on a side of the distribution plate facing the nozzle, at least one channel of the plurality of channels defining a first water path for a small stream of the water and a second water path for a large steam of the water along a common length of the at least one channel in a direction towards an exit of the at least one channel, the second water path having a first curved shape so as to impart lateral forces on the distribution plate in a first rotational direction;

a leading edge of the at least one channel having a second curved shape along the common length different from the first curved shape, wherein the second curved shape is configured to move the small stream in a lateral direction away from a midpoint or center of the second water path and in a first rotational direction so that at the exit the first water path is closer to a side of the at least one channel as a volumetric rate of the flow of the water decreases; and a flanged bolt configured to be supported by the body and disposed between the nozzle and the side of the distribution plate facing the nozzle, the flanged bolt supporting the second side of the base so that the deflector assembly can move with respect to the axis in at least the first rotational direction, and wherein the side of the at least one channel has a degree of curvature that is different from a degree of curvature from another side of the at least one channel in the direction towards the exit.

10. The sprinkler assembly of claim 9, wherein the at least one channel further comprises a radiused section, the radiused section blending the side and the another side together in an off center arrangement relative to a cross-sectional shape of the at least one channel.

11. The sprinkler assembly of claim 10, wherein near a center of the distribution plate the leading edge is centered relative to a midpoint of the at least one channel.

12. The sprinkler assembly of claim 9, wherein the distribution plate further comprises a web located between adjacent channels of the plurality of channels, the web having a wall thickness that is different than a wall thickness of the adjacent channels.

13. The sprinkler assembly of claim 9, further comprising a retainer configured to be inserted in the body and between the nozzle and the inlet, the retainer being configured to support a seal at least when disposed in the body, at least a portion of the nozzle engaging with the seal, the nozzle being tiltable to disengage from the seal when the nozzle and the retainer are both disposed in the body allowing the nozzle to be removed from the body independent from removing the retainer.

14. The sprinkler assembly of claim 13, wherein when the nozzle is engaged with the seal, the nozzle and the retainer can be removed from the body as a subassembly.

15. A sprinkler assembly comprising:

an inlet configured to receive water;

a body supported by the inlet;

a nozzle supported by the body and disposed downstream of the inlet, the nozzle being in fluid communication with the inlet and configured to direct the water out of the nozzle along an axis; and a distribution plate being coupled to the body to move with respect to the axis in at least a first rotational direction, the distribution plate having a plurality of channels on a side of the distribution plate facing the nozzle, at least one channel of the plurality of channels defining a water path having an entrance for receiving the water and an exit for distributing the water, the water path having a first curved shape so as to impart lateral forces on the distribution plate in the first rotational direction, the at least one channel of the plurality of channels having sides and a bottom surface connecting the sides, the bottom surface defining a leading edge that curves along a length of the at least one channel, the leading edge having a second curved shape different from the first curved shape, the second curved shape moving closer to one of the sides while moving away from another one of the sides along the length of the at least one channel in a direction towards the exit, the second curved shape being sized to move flow of the water in a lateral direction away from a midpoint or center of the water path and in the first rotational direction so that at the exit the water path is closer to the one of the sides than at the entrance as a volumetric rate of the flow of the water decreases, and wherein the one of the sides has a degree of curvature that is different from a degree of curvature from another side of the at least one channel in the direction towards the exit.

16. The sprinkler assembly of claim 15, wherein the distribution plate further comprises a web located between adjacent channels of the plurality of channels, the web having a wall thickness that is different than a wall thickness of the adjacent channels.

17. The sprinkler assembly of claim 15, further comprising a retainer configured to be inserted in the body and between the nozzle and the inlet, the retainer being configured to support a seal at least when disposed in the body, at least a portion of the nozzle engaging with the seal, the nozzle being tiltable relative to the retainer to disengage from the seal when the nozzle and the retainer are both disposed in the body allowing the nozzle to be removed from the body independent from removing the retainer.

18. The sprinkler assembly of claim 17, wherein when the nozzle is engaged with the seal, the nozzle and the retainer can be removed from the body as a subassembly.

* * * * *